US012748864B2

(12) United States Patent
McNutt et al.

(10) Patent No.: US 12,748,864 B2
(45) Date of Patent: *Sep. 29, 2026

(54) DATA ENCRYPTION AND DECRYPTION USING DYNAMIC SCREENS AND LOGIC BLOCKS

(71) Applicant: CERULEANT SYSTEMS, LLC, Crystal, MN (US)

(72) Inventors: Jason McNutt, Plymouth, MN (US); Amy J. Witty, Plymouth, MN (US)

(73) Assignee: CERULEANT SYSTEMS, LLC, Crystal, MN (US)

( * ) Notice: Subject to any disclaimer, the term of this patent is extended or adjusted under 35 U.S.C. 154(b) by 154 days.

This patent is subject to a terminal disclaimer.

(21) Appl. No.: 18/904,591

(22) Filed: Oct. 2, 2024

(65) Prior Publication Data

US 2025/0021671 A1 Jan. 16, 2025

Related U.S. Application Data

(63) Continuation-in-part of application No. 18/075,792, filed on Dec. 6, 2022.

(51) Int. Cl.
*G06F 21/60* (2013.01)
*G06F 7/58* (2006.01)

(52) U.S. Cl.
CPC ............ *G06F 21/602* (2013.01); *G06F 7/584* (2013.01)

(58) Field of Classification Search
CPC ............................... G06F 21/602; G06F 7/584
See application file for complete search history.

(56) References Cited

U.S. PATENT DOCUMENTS 5,003,596 A 3/1991 Wood
6,668,325 B1 12/2003 Collberg et al.
7,103,180 B1 9/2006 Mcgregor, Jr.
8,588,406 B2 11/2013 Dellow et al.
9,635,011 B1 4/2017 Wu et al.
2001/0009579 A1 7/2001 Inoha et al.
2004/0003282 A1 1/2004 Smith
2005/0251865 A1 11/2005 Mont et al.
(Continued)

FOREIGN PATENT DOCUMENTS

CN 106788974 A 5/2017
IN 202411012346 A1 3/2024
WO 2016187529 A1 11/2016

OTHER PUBLICATIONS

US 9,251,311 B2, 02/2016, Guirguis et al. (withdrawn)
(Continued)

*Primary Examiner* — Nicholas P Celani
(74) *Attorney, Agent, or Firm* — Stinson LLP

(57) ABSTRACT

A data encryption and decryption method using dynamic screens and logic blocks is disclosed. Data blocks are encrypted in accordance with an encryption scheme that transforms a data block into an encrypted data block by applying a dynamic screen and one or more logic blocks—wherein the dynamic screen and logic blocks are preferably different between successive data blocks. The encrypted data blocks may then be decrypted in accordance with a decryption scheme that transforms an encrypted data block into the original data block by applying a dynamic inverse screen and the same logic blocks that were used in the encryption scheme.

14 Claims, 29 Drawing Sheets

(56) References Cited

U.S. PATENT DOCUMENTS

| | | | |
|---|---|---|---|
| 2007/0121943 A1 | 5/2007 | Dellow et al. | |
| 2010/0195820 A1 | 8/2010 | Frank | |
| 2011/0194687 A1 | 8/2011 | Brothers | |
| 2012/0159186 A1 | 6/2012 | Farrugia et al. | |
| 2014/0380037 A1 | 12/2014 | Matsuda et al. | |
| 2015/0229621 A1 | 8/2015 | Kariman et al. | |
| 2016/0026829 A1* | 1/2016 | Brocker | G06F 21/87 726/34 |
| 2017/0293572 A1 | 10/2017 | Satpathy et al. | |
| 2017/0331624 A1 | 11/2017 | Samid | |
| 2017/0353302 A1 | 12/2017 | Fernandez et al. | |
| 2018/0097618 A1 | 4/2018 | Kumar et al. | |
| 2019/0007390 A1 | 1/2019 | Wu et al. | |
| 2020/0159944 A1* | 5/2020 | McNutt | H04L 9/3247 |
| 2020/0169383 A1 | 5/2020 | Durham et al. | |
| 2021/0211271 A1 | 7/2021 | Kuang et al. | |
| 2021/0258514 A1 | 8/2021 | Braness et al. | |
| 2022/0358203 A1 | 11/2022 | Qureshi et al. | |
| 2023/0123207 A1* | 4/2023 | McNutt | H04L 9/0872 713/167 |
| 2024/0187209 A1* | 6/2024 | McNutt | H04L 9/0618 |

OTHER PUBLICATIONS

Armknecht, F., et al., Article, "A Guide to Fully Homomorphic Encryption", IACR Cryptology ePrint Archive (2015) 35 pgs).

Mist, FIPS PUB 197: Announcing the Advanced Encryption Standard (AES), 2001. (51 pgs).

International Search Report and Written Opinion for related application, PCT/US2018/054807, mailed on Feb. 8, 2019 (21 pgs).

International Search Report and Written Opinion from related PCT application, PCT/US2023/082467, dated Mar. 13, 2024 (14 pgs).

* cited by examiner

LFSR A:

Seed A (bitstream, 129 bits):
10010010101100111111110011001000001010100001101101100011110000101
1111100010111010010100010001100011001101011101100110001010110100

Seed A (bytestream, 17 bytes):
49 cd 3f 13 54 d8 c6 43 3f ba 14 31 66 dd 8c 5a 00

Taps (0-based):
(123, 128)

FIG. 11

| Step | Seed / Output Bitstream (129 bits) | Bytestream |
|---|---|---|
| 0 | 10010010101100111111110011001000<br>00101010000110110110001111000010<br>11111100010111010010100010001100<br>01100110101110110011000101011010<br>0 | 49 cd 3f 13 54 d8 c6 43 3f ba 14 31 66 dd 8c 5a 00 |
| 1 | 11001001010110011111111001100100<br>00010101000011011011000111100001<br>01111110001011101001010001000110<br>00110011010111011001100010101101<br>0 | 93 9a 7f 26 a8 b0 8d 87 7e 74 29 62 cc ba 19 b5 00 |
| 2 | 01100100101011001111111100110010<br>00001010100001101101100011110000<br>10111111000101110100101000100011<br>00011001101011101100110001010110<br>1 | 26 35 ff 4c 50 61 1b 0f fd e8 52 c4 98 75 33 6a 01 |
| 3 | 00110010010101100111111110011001<br>00000101010000110110110001111000<br>01011111100010111010010100010001<br>10001100110101110110011000101011<br>0 | 4c 6a fe 99 a0 c2 36 1e fa d1 a5 88 31 eb 66 d4 00 |
| 4 | 00011001001010110011111111001100<br>10000010101000011011011000111100<br>00101111110001011101001010001000<br>11000110011010111011001100010101<br>1 | 98 d4 fc 33 41 85 6d 3c f4 a3 4b 11 63 d6 cd a8 01 |
| 32 | 00001011000111011101000110100001<br>10010010101100111111110011001000<br>00101010000110110110001111000010<br>11111100010111010010100010001100<br>0 | d0 b8 8b 85 49 cd 3f 13 54 d8 c6 43 3f ba 14 31 00 |
| 64 | 11010111011111111000001110010000<br>00001011000111011101000110100001<br>10010010101100111111110011001000<br>00101010000110110110001111000010<br>1 | eb fe c1 09 d0 b8 8b 85 49 cd 3f 13 54 d8 c6 43 01 |
| 96 | 11010110100101110111000110111001<br>11010111011111111000001110010000<br>00001011000111011101000110100001<br>10010010101100111111110011001000<br>0 | 6b e9 8e 9d eb fe c1 09 d0 b8 8b 85 49 cd 3f 13 00 |
| 128 | 00111100010011001100011001011100<br>11010110100101110111000110111001<br>11010111011111111000001110010000<br>00001011000111011101000110100001<br>1 | 3c 32 63 3a 6b e9 8e 9d eb fe c1 09 d0 b8 8b 85 01 |

FIG. 12A

| Step | Seed / Output Bitstream (129 bits) | Bytestream |
|---|---|---|
| 160 | 00010110100010100111111001011001<br>00111100010011001100011001011100<br>11010110100101110111000110111001<br>11010111011111111000001110010000<br>0 | 68 51 7e 9a 3c 32 63 3a 6b e9 8e 9d eb fe c1 09 00 |
| 192 | 00110011100010001111111100011001<br>00010110100010100111111001011001<br>00111100010011001100011001011100<br>11010110100101110111000110111001<br>1 | cc 11 ff 98 68 51 7e 9a 3c 32 63 3a 6b e9 8e 9d 01 |
| 224 | 01100000010001111001010001101000<br>00110011100010001111111100011001<br>00010110100010100111111001011001<br>00111100010011001100011001011100<br>1 | 06 e2 29 16 cc 11 ff 98 68 51 7e 9a 3c 32 63 3a 01 |
| 256 | 11101011010111010100000011011100<br>01100000010001111001010001101000<br>00110011100010001111111100011001<br>00010110100010100111111001011001<br>0 | d7 ba 02 3b 06 e2 29 16 cc 11 ff 98 68 51 7e 9a 00 |
| 288 | 10111100011111000101101101010111<br>11101011010111010100000011011100<br>01100000010001111001010001101000<br>00110011100010001111111100011001<br>0 | 3d 3e da ea d7 ba 02 3b 06 e2 29 16 cc 11 ff 98 00 |
| 320 | 11100100001010010111000111000011<br>10111100011111000101101101010111<br>11101011010111010100000011011100<br>01100000010001111001010001101000<br>0 | 27 94 8e c3 3d 3e da ea d7 ba 02 3b 06 e2 29 16 00 |
| 352 | 00000110100010110101000110010110<br>11100100001010010111000111000011<br>10111100011111000101101101010111<br>11101011010111010100000011011100<br>0 | 60 d1 8a 69 27 94 8e c3 3d 3e da ea d7 ba 02 3b 00 |
| 384 | 10101000000011110101010110110101<br>00000110100010110101000110010110<br>11100100001010010111000111000011<br>10111100011111000101101101010111<br>1 | 15 f0 aa ad 60 d1 8a 69 27 94 8e c3 3d 3e da ea 01 |

FIG. 12B

| block | LFSR Step | Output Bitstream (bits 0-31) | Bytestream (for verification) | Subscreen Numbers |
|---|---|---|---|---|
| 0 | 32 | 00001011000111011101000110100001 | d0 b8 8b 85 | 0, 11, 1, 13, 13, 1, 10, 1 |
| 1 | 64 | 11010111011111111000001110010000 | eb fe c1 09 | 13, 7, 7, 15, 8, 3, 9, 0 |
| 2 | 96 | 11010110100101110111000110111001 | 6b e9 8e 9d | 13, 6, 9, 7, 7, 1, 11, 9 |
| 3 | 128 | 00111100010011001100011001011100 | 3c 32 63 3a | 3, 12, 4, 12, 12, 6, 5, 12 |
| 4 | 160 | 00010110100010100111111001011001 | 68 51 7e 9a | 1, 6, 8, 10, 7, 14, 5, 9 |
| 5 | 192 | 00110011100010001111111100011001 | cc 11 ff 98 | 3, 3, 8, 8, 15, 15, 1, 9 |
| 6 | 224 | 01100000010001111001010001101000 | 06 e2 29 16 | 6, 0, 4, 7, 9, 4, 6, 8 |
| 7 | 256 | 11101011010111010100000011011100 | d7 ba 02 3b | 14, 11, 5, 13, 4, 0, 13, 12 |
| 8 | 288 | 10111100011111000101101101010111 | 3d 3e da ea | 11, 12, 7, 12, 5, 11, 5, 7 |
| 9 | 320 | 11100100001010010111000111000011 | 27 94 8e c3 | 14, 4, 2, 9, 7, 1, 12, 3 |

FIG. 13

| SS | Subscreens | | | | | | | | | | | | | | | |
|---|---|---|---|---|---|---|---|---|---|---|---|---|---|---|---|---|
| 0 | 2 | 6 | 13 | 10 | 9 | 14 | 15 | 12 | 3 | 1 | 4 | 7 | 5 | 8 | 11 | 0 |
| 1 | 9 | 1 | 13 | 3 | 14 | 6 | 12 | 4 | 7 | 5 | 10 | 8 | 2 | 11 | 0 | 15 |
| 2 | 5 | 7 | 8 | 1 | 14 | 3 | 12 | 0 | 15 | 9 | 11 | 10 | 2 | 13 | 4 | 6 |
| 3 | 11 | 10 | 12 | 5 | 9 | 2 | 13 | 4 | 6 | 3 | 1 | 7 | 8 | 14 | 0 | 15 |
| 4 | 1 | 12 | 5 | 11 | 3 | 7 | 4 | 8 | 13 | 6 | 2 | 0 | 15 | 14 | 9 | 10 |
| 5 | 12 | 5 | 8 | 4 | 2 | 13 | 9 | 10 | 3 | 0 | 11 | 6 | 15 | 7 | 14 | 1 |
| 6 | 2 | 10 | 9 | 1 | 0 | 7 | 3 | 13 | 6 | 15 | 14 | 11 | 12 | 4 | 8 | 5 |
| 7 | 13 | 14 | 11 | 15 | 12 | 0 | 4 | 8 | 9 | 7 | 5 | 3 | 6 | 10 | 2 | 1 |
| 8 | 0 | 7 | 10 | 9 | 1 | 15 | 4 | 8 | 6 | 3 | 5 | 2 | 12 | 11 | 13 | 14 |
| 9 | 3 | 2 | 4 | 0 | 12 | 15 | 1 | 11 | 13 | 5 | 10 | 14 | 7 | 9 | 8 | 6 |
| 10 | 4 | 2 | 0 | 5 | 11 | 1 | 14 | 6 | 9 | 15 | 10 | 8 | 7 | 3 | 12 | 13 |
| 11 | 8 | 0 | 7 | 3 | 12 | 13 | 5 | 15 | 4 | 14 | 6 | 10 | 1 | 2 | 11 | 9 |
| 12 | 5 | 15 | 10 | 7 | 6 | 13 | 4 | 8 | 14 | 2 | 1 | 9 | 11 | 3 | 12 | 0 |
| 13 | 10 | 8 | 13 | 5 | 2 | 15 | 4 | 7 | 1 | 11 | 12 | 6 | 9 | 14 | 0 | 3 |
| 14 | 5 | 11 | 12 | 13 | 8 | 15 | 9 | 0 | 7 | 4 | 1 | 3 | 6 | 14 | 10 | 2 |
| 15 | 3 | 15 | 8 | 5 | 0 | 7 | 1 | 14 | 10 | 9 | 12 | 2 | 6 | 11 | 13 | 4 |

FIG. 14 p: 0

Subscreens (0) LFSR step 32

| SS | | A | B | C | D | E | F | G | H | I | J | K | L | M | N | O | P |
|---|---|---|---|---|---|---|---|---|---|---|---|---|---|---|---|---|---|
| 0 | 1 | 2 | 6 | 13 | 10 | 9 | 14 | 15 | 12 | 3 | 1 | 4 | 7 | 5 | 8 | 11 | 0 |
| 11 | 2 | 8 | 0 | 7 | 3 | 12 | 13 | 5 | 15 | 4 | 14 | 6 | 10 | 1 | 2 | 11 | 9 |
| 1 | 3 | 9 | 1 | 13 | 3 | 14 | 6 | 12 | 4 | 7 | 5 | 10 | 8 | 2 | 11 | 0 | 15 |
| 13 | 4 | 10 | 8 | 13 | 5 | 2 | 15 | 4 | 7 | 1 | 11 | 12 | 6 | 9 | 14 | 0 | 3 |
| 13 | 5 | 10 | 8 | 13 | 5 | 2 | 15 | 4 | 7 | 1 | 11 | 12 | 6 | 9 | 14 | 0 | 3 |
| 1 | 6 | 9 | 1 | 13 | 3 | 14 | 6 | 12 | 4 | 7 | 5 | 10 | 8 | 2 | 11 | 0 | 15 |
| 10 | 7 | 4 | 2 | 0 | 5 | 11 | 1 | 14 | 6 | 9 | 15 | 10 | 8 | 7 | 3 | 12 | 13 |
| 1 | 8 | 9 | 1 | 13 | 3 | 14 | 6 | 12 | 4 | 7 | 5 | 10 | 8 | 2 | 11 | 0 | 15 |

Screen (0)

| | A | B | C | D | E | F | G | H | I | J | K | L | M | N | O | P |
|---|---|---|---|---|---|---|---|---|---|---|---|---|---|---|---|---|
| 1 | 2 | 6 | 13 | 10 | 9 | 14 | 15 | 12 | 3 | 1 | 4 | 7 | 5 | 8 | 11 | 0 |
| 2 | 24 | 16 | 23 | 19 | 28 | 29 | 21 | 31 | 20 | 30 | 22 | 26 | 17 | 18 | 27 | 25 |
| 3 | 41 | 33 | 45 | 35 | 46 | 38 | 44 | 36 | 39 | 37 | 42 | 40 | 34 | 43 | 32 | 47 |
| 4 | 58 | 56 | 61 | 53 | 50 | 63 | 52 | 55 | 49 | 59 | 60 | 54 | 57 | 62 | 48 | 51 |
| 5 | 74 | 72 | 77 | 69 | 66 | 79 | 68 | 71 | 65 | 75 | 76 | 70 | 73 | 78 | 64 | 67 |
| 6 | 89 | 81 | 93 | 83 | 94 | 86 | 92 | 84 | 87 | 85 | 90 | 88 | 82 | 91 | 80 | 95 |
| 7 | 100 | 98 | 96 | 101 | 107 | 97 | 110 | 102 | 105 | 111 | 106 | 104 | 103 | 99 | 108 | 109 |
| 8 | 121 | 113 | 125 | 115 | 126 | 118 | 124 | 116 | 119 | 117 | 122 | 120 | 114 | 123 | 112 | 127 |

p: 1

Subscreens (1) LFSR step 64

| SS | | A | B | C | D | E | F | G | H | I | J | K | L | M | N | O | P |
|---|---|---|---|---|---|---|---|---|---|---|---|---|---|---|---|---|---|
| 13 | 1 | 10 | 8 | 13 | 5 | 2 | 15 | 4 | 7 | 1 | 11 | 12 | 6 | 9 | 14 | 0 | 3 |
| 7 | 2 | 13 | 14 | 11 | 15 | 12 | 0 | 4 | 8 | 9 | 7 | 5 | 3 | 6 | 10 | 2 | 1 |
| 7 | 3 | 13 | 14 | 11 | 15 | 12 | 0 | 4 | 8 | 9 | 7 | 5 | 3 | 6 | 10 | 2 | 1 |
| 15 | 4 | 3 | 15 | 8 | 5 | 0 | 7 | 1 | 14 | 10 | 9 | 12 | 2 | 6 | 11 | 13 | 4 |
| 8 | 5 | 0 | 7 | 10 | 9 | 1 | 15 | 4 | 8 | 6 | 3 | 5 | 2 | 12 | 11 | 13 | 14 |
| 3 | 6 | 11 | 10 | 12 | 5 | 9 | 2 | 13 | 4 | 6 | 3 | 1 | 7 | 8 | 14 | 0 | 15 |
| 9 | 7 | 3 | 2 | 4 | 0 | 12 | 15 | 1 | 11 | 13 | 5 | 10 | 14 | 7 | 9 | 8 | 6 |
| 0 | 8 | 2 | 6 | 13 | 10 | 9 | 14 | 15 | 12 | 3 | 1 | 4 | 7 | 5 | 8 | 11 | 0 |

Screen (1)

| | A | B | C | D | E | F | G | H | I | J | K | L | M | N | O | P |
|---|---|---|---|---|---|---|---|---|---|---|---|---|---|---|---|---|
| 1 | 10 | 8 | 13 | 5 | 2 | 15 | 4 | 7 | 1 | 11 | 12 | 6 | 9 | 14 | 0 | 3 |
| 2 | 29 | 30 | 27 | 31 | 28 | 16 | 20 | 24 | 25 | 23 | 21 | 19 | 22 | 26 | 18 | 17 |
| 3 | 45 | 46 | 43 | 47 | 44 | 32 | 36 | 40 | 41 | 39 | 37 | 35 | 38 | 42 | 34 | 33 |
| 4 | 51 | 63 | 56 | 53 | 48 | 55 | 49 | 62 | 58 | 57 | 60 | 50 | 54 | 59 | 61 | 52 |
| 5 | 64 | 71 | 74 | 73 | 65 | 79 | 68 | 72 | 70 | 67 | 69 | 66 | 76 | 75 | 77 | 78 |
| 6 | 91 | 90 | 92 | 85 | 89 | 82 | 93 | 84 | 86 | 83 | 81 | 87 | 88 | 94 | 80 | 95 |
| 7 | 99 | 98 | 100 | 96 | 108 | 111 | 97 | 107 | 109 | 101 | 106 | 110 | 103 | 105 | 104 | 102 |
| 8 | 114 | 118 | 125 | 122 | 121 | 126 | 127 | 124 | 115 | 113 | 116 | 119 | 117 | 120 | 123 | 112 |

p: 2

Subscreens (2) LFSR step 96

| SS | | A | B | C | D | E | F | G | H | I | J | K | L | M | N | O | P |
|---|---|---|---|---|---|---|---|---|---|---|---|---|---|---|---|---|---|
| 13 | 1 | 10 | 8 | 13 | 5 | 2 | 15 | 4 | 7 | 1 | 11 | 12 | 6 | 9 | 14 | 0 | 3 |
| 6 | 2 | 2 | 10 | 9 | 1 | 0 | 7 | 3 | 13 | 6 | 15 | 14 | 11 | 12 | 4 | 8 | 5 |
| 9 | 3 | 3 | 2 | 4 | 0 | 12 | 15 | 1 | 11 | 13 | 5 | 10 | 14 | 7 | 9 | 8 | 6 |
| 7 | 4 | 13 | 14 | 11 | 15 | 12 | 0 | 4 | 8 | 9 | 7 | 5 | 3 | 6 | 10 | 2 | 1 |
| 7 | 5 | 13 | 14 | 11 | 15 | 12 | 0 | 4 | 8 | 9 | 7 | 5 | 3 | 6 | 10 | 2 | 1 |
| 1 | 6 | 9 | 1 | 13 | 3 | 14 | 6 | 12 | 4 | 7 | 5 | 10 | 8 | 2 | 11 | 0 | 15 |
| 11 | 7 | 8 | 0 | 7 | 3 | 12 | 13 | 5 | 15 | 4 | 14 | 6 | 10 | 1 | 2 | 11 | 9 |
| 9 | 8 | 3 | 2 | 4 | 0 | 12 | 15 | 1 | 11 | 13 | 5 | 10 | 14 | 7 | 9 | 8 | 6 |

Screen (2)

| | A | B | C | D | E | F | G | H | I | J | K | L | M | N | O | P |
|---|---|---|---|---|---|---|---|---|---|---|---|---|---|---|---|---|
| 1 | 10 | 8 | 13 | 5 | 2 | 15 | 4 | 7 | 1 | 11 | 12 | 6 | 9 | 14 | 0 | 3 |
| 2 | 18 | 26 | 25 | 17 | 16 | 23 | 19 | 29 | 22 | 31 | 30 | 27 | 28 | 20 | 24 | 21 |
| 3 | 35 | 34 | 36 | 32 | 44 | 47 | 33 | 43 | 45 | 37 | 42 | 46 | 39 | 41 | 40 | 38 |
| 4 | 61 | 62 | 59 | 63 | 60 | 48 | 52 | 56 | 57 | 55 | 53 | 51 | 54 | 58 | 50 | 49 |
| 5 | 77 | 78 | 75 | 79 | 76 | 64 | 68 | 72 | 73 | 71 | 69 | 67 | 70 | 74 | 66 | 65 |
| 6 | 89 | 81 | 93 | 83 | 94 | 86 | 92 | 84 | 87 | 85 | 90 | 88 | 82 | 91 | 80 | 95 |
| 7 | 104 | 96 | 103 | 99 | 108 | 109 | 101 | 111 | 100 | 110 | 102 | 106 | 97 | 98 | 107 | 105 |
| 8 | 115 | 114 | 116 | 112 | 124 | 127 | 113 | 123 | 125 | 117 | 122 | 126 | 119 | 121 | 120 | 118 |

p: 3

Subscreens (3) LFSR step 128

| SS | | A | B | C | D | E | F | G | H | I | J | K | L | M | N | O | P |
|---|---|---|---|---|---|---|---|---|---|---|---|---|---|---|---|---|---|
| 3 | 1 | 11 | 10 | 12 | 5 | 9 | 2 | 13 | 4 | 6 | 3 | 1 | 7 | 8 | 14 | 0 | 15 |
| 12 | 2 | 5 | 15 | 10 | 7 | 6 | 13 | 4 | 8 | 14 | 2 | 1 | 9 | 11 | 3 | 12 | 0 |
| 4 | 3 | 1 | 12 | 5 | 11 | 3 | 7 | 4 | 8 | 13 | 6 | 2 | 0 | 15 | 14 | 9 | 10 |
| 12 | 4 | 5 | 15 | 10 | 7 | 6 | 13 | 4 | 8 | 14 | 2 | 1 | 9 | 11 | 3 | 12 | 0 |
| 12 | 5 | 5 | 15 | 10 | 7 | 6 | 13 | 4 | 8 | 14 | 2 | 1 | 9 | 11 | 3 | 12 | 0 |
| 6 | 6 | 2 | 10 | 9 | 1 | 0 | 7 | 3 | 13 | 6 | 15 | 14 | 11 | 12 | 4 | 8 | 5 |
| 5 | 7 | 12 | 5 | 8 | 4 | 2 | 13 | 9 | 10 | 3 | 0 | 11 | 6 | 15 | 7 | 14 | 1 |
| 12 | 8 | 5 | 15 | 10 | 7 | 6 | 13 | 4 | 8 | 14 | 2 | 1 | 9 | 11 | 3 | 12 | 0 |

Screen (3)

| | A | B | C | D | E | F | G | H | I | J | K | L | M | N | O | P |
|---|---|---|---|---|---|---|---|---|---|---|---|---|---|---|---|---|
| 1 | 11 | 10 | 12 | 5 | 9 | 2 | 13 | 4 | 6 | 3 | 1 | 7 | 8 | 14 | 0 | 15 |
| 2 | 21 | 31 | 26 | 23 | 22 | 29 | 20 | 24 | 30 | 18 | 17 | 25 | 27 | 19 | 28 | 16 |
| 3 | 33 | 44 | 37 | 43 | 35 | 39 | 36 | 40 | 45 | 38 | 34 | 32 | 47 | 46 | 41 | 42 |
| 4 | 53 | 63 | 58 | 55 | 54 | 61 | 52 | 56 | 62 | 50 | 49 | 57 | 59 | 51 | 60 | 48 |
| 5 | 69 | 79 | 74 | 71 | 70 | 77 | 68 | 72 | 78 | 66 | 65 | 73 | 75 | 67 | 76 | 64 |
| 6 | 82 | 90 | 89 | 81 | 80 | 87 | 83 | 93 | 86 | 95 | 94 | 91 | 92 | 84 | 88 | 85 |
| 7 | 108 | 101 | 104 | 100 | 98 | 109 | 105 | 106 | 99 | 96 | 107 | 102 | 111 | 103 | 110 | 97 |
| 8 | 117 | 127 | 122 | 119 | 118 | 125 | 116 | 120 | 126 | 114 | 113 | 121 | 123 | 115 | 124 | 112 |

p: 4

Subscreens (4) LFSR step 160

| SS | | A | B | C | D | E | F | G | H | I | J | K | L | M | N | O | P |
|---|---|---|---|---|---|---|---|---|---|---|---|---|---|---|---|---|---|
| 1 | 1 | 9 | 1 | 13 | 3 | 14 | 6 | 12 | 4 | 7 | 5 | 10 | 8 | 2 | 11 | 0 | 15 |
| 6 | 2 | 2 | 10 | 9 | 1 | 0 | 7 | 3 | 13 | 6 | 15 | 14 | 11 | 12 | 4 | 8 | 5 |
| 8 | 3 | 0 | 7 | 10 | 9 | 1 | 15 | 4 | 8 | 6 | 3 | 5 | 2 | 12 | 11 | 13 | 14 |
| 10 | 4 | 4 | 2 | 0 | 5 | 11 | 1 | 14 | 6 | 9 | 15 | 10 | 8 | 7 | 3 | 12 | 13 |
| 7 | 5 | 13 | 14 | 11 | 15 | 12 | 0 | 4 | 8 | 9 | 7 | 5 | 3 | 6 | 10 | 2 | 1 |
| 14 | 6 | 5 | 11 | 12 | 13 | 8 | 15 | 9 | 0 | 7 | 4 | 1 | 3 | 6 | 14 | 10 | 2 |
| 5 | 7 | 12 | 5 | 8 | 4 | 2 | 13 | 9 | 10 | 3 | 0 | 11 | 6 | 15 | 7 | 14 | 1 |
| 9 | 8 | 3 | 2 | 4 | 0 | 12 | 15 | 1 | 11 | 13 | 5 | 10 | 14 | 7 | 9 | 8 | 6 |

Screen (4)

| | A | B | C | D | E | F | G | H | I | J | K | L | M | N | O | P |
|---|---|---|---|---|---|---|---|---|---|---|---|---|---|---|---|---|
| 1 | 9 | 1 | 13 | 3 | 14 | 6 | 12 | 4 | 7 | 5 | 10 | 8 | 2 | 11 | 0 | 15 |
| 2 | 18 | 26 | 25 | 17 | 16 | 23 | 19 | 29 | 22 | 31 | 30 | 27 | 28 | 20 | 24 | 21 |
| 3 | 32 | 39 | 42 | 41 | 33 | 47 | 36 | 40 | 38 | 35 | 37 | 34 | 44 | 43 | 45 | 46 |
| 4 | 52 | 50 | 48 | 53 | 59 | 49 | 62 | 54 | 57 | 63 | 58 | 56 | 55 | 51 | 60 | 61 |
| 5 | 77 | 78 | 75 | 79 | 76 | 64 | 68 | 72 | 73 | 71 | 69 | 67 | 70 | 74 | 66 | 65 |
| 6 | 85 | 91 | 92 | 93 | 88 | 95 | 89 | 80 | 87 | 84 | 81 | 83 | 86 | 94 | 90 | 82 |
| 7 | 108 | 101 | 104 | 100 | 98 | 109 | 105 | 106 | 99 | 96 | 107 | 102 | 111 | 103 | 110 | 97 |
| 8 | 115 | 114 | 116 | 112 | 124 | 127 | 113 | 123 | 125 | 117 | 122 | 126 | 119 | 121 | 120 | 118 |

FIG. 15A p 5

Subscreens (5) LFSR step 192

| SS | | A | B | C | D | E | F | G | H | I | J | K | L | M | N | O | P |
|---|---|---|---|---|---|---|---|---|---|---|---|---|---|---|---|---|---|
| 3 | 1 | 11 | 10 | 12 | 5 | 9 | 2 | 13 | 4 | 6 | 3 | 1 | 7 | 8 | 14 | 0 | 15 |
| 3 | 2 | 11 | 10 | 12 | 5 | 9 | 2 | 13 | 4 | 6 | 3 | 1 | 7 | 8 | 14 | 0 | 15 |
| 8 | 3 | 0 | 7 | 10 | 9 | 1 | 15 | 4 | 8 | 6 | 3 | 5 | 2 | 12 | 11 | 13 | 14 |
| 8 | 4 | 0 | 7 | 10 | 9 | 1 | 15 | 4 | 8 | 6 | 3 | 5 | 2 | 12 | 11 | 13 | 14 |
| 15 | 5 | 3 | 15 | 8 | 5 | 0 | 7 | 1 | 14 | 10 | 9 | 12 | 2 | 6 | 11 | 13 | 4 |
| 15 | 6 | 3 | 15 | 8 | 5 | 0 | 7 | 1 | 14 | 10 | 9 | 12 | 2 | 6 | 11 | 13 | 4 |
| 1 | 7 | 9 | 1 | 13 | 3 | 14 | 6 | 12 | 4 | 7 | 5 | 10 | 8 | 2 | 11 | 0 | 15 |
| 9 | 8 | 3 | 2 | 4 | 0 | 12 | 15 | 1 | 11 | 13 | 5 | 10 | 14 | 7 | 9 | 8 | 6 |

Screen (5)

| | A | B | C | D | E | F | G | H | I | J | K | L | M | N | O | P |
|---|---|---|---|---|---|---|---|---|---|---|---|---|---|---|---|---|
| 1 | 11 | 10 | 12 | 5 | 9 | 2 | 13 | 4 | 6 | 3 | 1 | 7 | 8 | 14 | 0 | 15 |
| 2 | 27 | 26 | 28 | 21 | 25 | 18 | 29 | 20 | 22 | 19 | 17 | 23 | 24 | 30 | 16 | 31 |
| 3 | 32 | 39 | 42 | 41 | 33 | 47 | 36 | 40 | 38 | 35 | 37 | 34 | 44 | 43 | 45 | 46 |
| 4 | 48 | 55 | 58 | 57 | 49 | 63 | 52 | 56 | 54 | 51 | 53 | 50 | 60 | 59 | 61 | 62 |
| 5 | 67 | 79 | 72 | 69 | 64 | 71 | 65 | 78 | 74 | 73 | 76 | 66 | 70 | 75 | 77 | 68 |
| 6 | 83 | 95 | 88 | 85 | 80 | 87 | 81 | 94 | 90 | 89 | 92 | 82 | 86 | 91 | 93 | 84 |
| 7 | 105 | 97 | 109 | 99 | 110 | 102 | 108 | 100 | 103 | 101 | 106 | 104 | 98 | 107 | 96 | 111 |
| 8 | 115 | 114 | 116 | 112 | 124 | 127 | 113 | 123 | 125 | 117 | 122 | 126 | 119 | 121 | 120 | 118 |

p 6

Subscreens (6) LFSR step 224

| SS | | A | B | C | D | E | F | G | H | I | J | K | L | M | N | O | P |
|---|---|---|---|---|---|---|---|---|---|---|---|---|---|---|---|---|---|
| 6 | 1 | 2 | 10 | 9 | 1 | 0 | 7 | 3 | 13 | 6 | 15 | 14 | 11 | 12 | 4 | 8 | 5 |
| 0 | 2 | 2 | 6 | 13 | 10 | 9 | 14 | 15 | 12 | 3 | 1 | 4 | 7 | 5 | 8 | 11 | 0 |
| 4 | 3 | 1 | 12 | 5 | 11 | 3 | 7 | 4 | 8 | 13 | 6 | 2 | 0 | 15 | 14 | 9 | 10 |
| 7 | 4 | 13 | 14 | 11 | 15 | 12 | 0 | 4 | 8 | 9 | 7 | 5 | 3 | 6 | 10 | 2 | 1 |
| 9 | 5 | 3 | 2 | 4 | 0 | 12 | 15 | 1 | 11 | 13 | 5 | 10 | 14 | 7 | 9 | 8 | 6 |
| 4 | 6 | 1 | 12 | 5 | 11 | 3 | 7 | 4 | 8 | 13 | 6 | 2 | 0 | 15 | 14 | 9 | 10 |
| 6 | 7 | 2 | 10 | 9 | 1 | 0 | 7 | 3 | 13 | 6 | 15 | 14 | 11 | 12 | 4 | 8 | 5 |
| 8 | 8 | 0 | 7 | 10 | 9 | 1 | 15 | 4 | 8 | 6 | 3 | 5 | 2 | 12 | 11 | 13 | 14 |

Screen (6)

| | A | B | C | D | E | F | G | H | I | J | K | L | M | N | O | P |
|---|---|---|---|---|---|---|---|---|---|---|---|---|---|---|---|---|
| 1 | 2 | 10 | 9 | 1 | 0 | 7 | 3 | 13 | 6 | 15 | 14 | 11 | 12 | 4 | 8 | 5 |
| 2 | 18 | 22 | 29 | 26 | 25 | 30 | 31 | 28 | 19 | 17 | 20 | 23 | 21 | 24 | 27 | 16 |
| 3 | 33 | 44 | 37 | 43 | 35 | 39 | 36 | 40 | 45 | 38 | 34 | 32 | 47 | 46 | 41 | 42 |
| 4 | 61 | 62 | 59 | 63 | 60 | 48 | 52 | 56 | 57 | 55 | 53 | 51 | 54 | 58 | 50 | 49 |
| 5 | 67 | 66 | 68 | 64 | 76 | 79 | 65 | 75 | 77 | 69 | 74 | 78 | 71 | 73 | 72 | 70 |
| 6 | 81 | 92 | 85 | 91 | 83 | 87 | 84 | 88 | 93 | 86 | 82 | 80 | 95 | 94 | 89 | 90 |
| 7 | 98 | 106 | 105 | 97 | 96 | 103 | 99 | 109 | 102 | 111 | 110 | 107 | 108 | 100 | 104 | 101 |
| 8 | 112 | 119 | 122 | 121 | 113 | 127 | 116 | 120 | 118 | 115 | 117 | 114 | 124 | 123 | 125 | 126 |

p 7

Subscreens (7) LFSR step 256

| SS | | A | B | C | D | E | F | G | H | I | J | K | L | M | N | O | P |
|---|---|---|---|---|---|---|---|---|---|---|---|---|---|---|---|---|---|
| 14 | 1 | 5 | 11 | 12 | 13 | 8 | 15 | 9 | 0 | 7 | 4 | 1 | 3 | 6 | 14 | 10 | 2 |
| 11 | 2 | 8 | 0 | 7 | 3 | 12 | 13 | 5 | 15 | 4 | 14 | 6 | 10 | 1 | 2 | 11 | 9 |
| 5 | 3 | 12 | 5 | 8 | 4 | 2 | 13 | 9 | 10 | 3 | 0 | 11 | 6 | 15 | 7 | 14 | 1 |
| 13 | 4 | 10 | 8 | 13 | 5 | 2 | 15 | 4 | 7 | 1 | 11 | 12 | 6 | 9 | 14 | 0 | 3 |
| 4 | 5 | 1 | 12 | 5 | 11 | 3 | 7 | 4 | 8 | 13 | 6 | 2 | 0 | 15 | 14 | 9 | 10 |
| 0 | 6 | 2 | 6 | 13 | 10 | 9 | 14 | 15 | 12 | 3 | 1 | 4 | 7 | 5 | 8 | 11 | 0 |
| 13 | 7 | 10 | 8 | 13 | 5 | 2 | 15 | 4 | 7 | 1 | 11 | 12 | 6 | 9 | 14 | 0 | 3 |
| 12 | 8 | 5 | 15 | 10 | 7 | 6 | 13 | 4 | 8 | 14 | 2 | 1 | 9 | 11 | 3 | 12 | 0 |

Screen (7)

| | A | B | C | D | E | F | G | H | I | J | K | L | M | N | O | P |
|---|---|---|---|---|---|---|---|---|---|---|---|---|---|---|---|---|
| 1 | 5 | 11 | 12 | 13 | 8 | 15 | 9 | 0 | 7 | 4 | 1 | 3 | 6 | 14 | 10 | 2 |
| 2 | 24 | 16 | 23 | 19 | 28 | 29 | 21 | 31 | 20 | 30 | 22 | 26 | 17 | 18 | 27 | 25 |
| 3 | 44 | 37 | 40 | 36 | 34 | 45 | 41 | 42 | 35 | 32 | 43 | 38 | 47 | 39 | 46 | 33 |
| 4 | 58 | 56 | 61 | 53 | 50 | 63 | 52 | 55 | 49 | 59 | 60 | 54 | 57 | 62 | 48 | 51 |
| 5 | 65 | 76 | 69 | 75 | 67 | 71 | 68 | 72 | 77 | 70 | 66 | 64 | 79 | 78 | 73 | 74 |
| 6 | 82 | 86 | 93 | 90 | 89 | 94 | 95 | 92 | 83 | 81 | 84 | 87 | 85 | 88 | 91 | 80 |
| 7 | 106 | 104 | 109 | 101 | 98 | 111 | 100 | 103 | 97 | 107 | 108 | 102 | 105 | 110 | 96 | 99 |
| 8 | 117 | 127 | 122 | 119 | 118 | 125 | 116 | 120 | 126 | 114 | 113 | 121 | 123 | 115 | 124 | 112 |

p 8

Subscreens (8) LFSR step 288

| SS | | A | B | C | D | E | F | G | H | I | J | K | L | M | N | O | P |
|---|---|---|---|---|---|---|---|---|---|---|---|---|---|---|---|---|---|
| 11 | 1 | 8 | 0 | 7 | 3 | 12 | 13 | 5 | 15 | 4 | 14 | 6 | 10 | 1 | 2 | 11 | 9 |
| 12 | 2 | 5 | 15 | 10 | 7 | 6 | 13 | 4 | 8 | 14 | 2 | 1 | 9 | 11 | 3 | 12 | 0 |
| 7 | 3 | 13 | 14 | 11 | 15 | 12 | 0 | 4 | 8 | 9 | 7 | 5 | 3 | 6 | 10 | 2 | 1 |
| 12 | 4 | 5 | 15 | 10 | 7 | 6 | 13 | 4 | 8 | 14 | 2 | 1 | 9 | 11 | 3 | 12 | 0 |
| 5 | 5 | 12 | 5 | 8 | 4 | 2 | 13 | 9 | 10 | 3 | 0 | 11 | 6 | 15 | 7 | 14 | 1 |
| 11 | 6 | 8 | 0 | 7 | 3 | 12 | 13 | 5 | 15 | 4 | 14 | 6 | 10 | 1 | 2 | 11 | 9 |
| 5 | 7 | 12 | 5 | 8 | 4 | 2 | 13 | 9 | 10 | 3 | 0 | 11 | 6 | 15 | 7 | 14 | 1 |
| 7 | 8 | 13 | 14 | 11 | 15 | 12 | 0 | 4 | 8 | 9 | 7 | 5 | 3 | 6 | 10 | 2 | 1 |

Screen (8)

| | A | B | C | D | E | F | G | H | I | J | K | L | M | N | O | P |
|---|---|---|---|---|---|---|---|---|---|---|---|---|---|---|---|---|
| 1 | 8 | 0 | 7 | 3 | 12 | 13 | 5 | 15 | 4 | 14 | 6 | 10 | 1 | 2 | 11 | 9 |
| 2 | 21 | 31 | 26 | 23 | 22 | 29 | 20 | 24 | 30 | 18 | 17 | 25 | 27 | 19 | 28 | 16 |
| 3 | 45 | 46 | 43 | 47 | 44 | 32 | 36 | 40 | 41 | 39 | 37 | 35 | 38 | 42 | 34 | 33 |
| 4 | 53 | 63 | 58 | 55 | 54 | 61 | 52 | 56 | 62 | 50 | 49 | 57 | 59 | 51 | 60 | 48 |
| 5 | 76 | 69 | 72 | 68 | 66 | 77 | 73 | 74 | 67 | 64 | 75 | 70 | 79 | 71 | 78 | 65 |
| 6 | 88 | 80 | 87 | 83 | 92 | 93 | 85 | 95 | 84 | 94 | 86 | 90 | 81 | 82 | 91 | 89 |
| 7 | 108 | 101 | 104 | 100 | 98 | 109 | 105 | 106 | 99 | 96 | 107 | 102 | 111 | 103 | 110 | 97 |
| 8 | 125 | 126 | 123 | 127 | 124 | 112 | 116 | 120 | 121 | 119 | 117 | 115 | 118 | 122 | 114 | 113 |

p 9

Subscreens (9) LFSR step 320

| SS | | A | B | C | D | E | F | G | H | I | J | K | L | M | N | O | P |
|---|---|---|---|---|---|---|---|---|---|---|---|---|---|---|---|---|---|
| 14 | 1 | 5 | 11 | 12 | 13 | 8 | 15 | 9 | 0 | 7 | 4 | 1 | 3 | 6 | 14 | 10 | 2 |
| 4 | 2 | 1 | 12 | 5 | 11 | 3 | 7 | 4 | 8 | 13 | 6 | 2 | 0 | 15 | 14 | 9 | 10 |
| 2 | 3 | 5 | 7 | 8 | 1 | 14 | 3 | 12 | 0 | 15 | 9 | 11 | 10 | 2 | 13 | 4 | 6 |
| 9 | 4 | 3 | 2 | 4 | 0 | 12 | 15 | 1 | 11 | 13 | 5 | 10 | 14 | 7 | 9 | 8 | 6 |
| 7 | 5 | 13 | 14 | 11 | 15 | 12 | 0 | 4 | 8 | 9 | 7 | 5 | 3 | 6 | 10 | 2 | 1 |
| 1 | 6 | 9 | 1 | 13 | 3 | 14 | 6 | 12 | 4 | 7 | 5 | 10 | 8 | 2 | 11 | 0 | 15 |
| 12 | 7 | 5 | 15 | 10 | 7 | 6 | 13 | 4 | 8 | 14 | 2 | 1 | 9 | 11 | 3 | 12 | 0 |
| 3 | 8 | 11 | 10 | 12 | 5 | 9 | 2 | 13 | 4 | 6 | 3 | 1 | 7 | 8 | 14 | 0 | 15 |

Screen (9)

| | A | B | C | D | E | F | G | H | I | J | K | L | M | N | O | P |
|---|---|---|---|---|---|---|---|---|---|---|---|---|---|---|---|---|
| 1 | 5 | 11 | 12 | 13 | 8 | 15 | 9 | 0 | 7 | 4 | 1 | 3 | 6 | 14 | 10 | 2 |
| 2 | 17 | 28 | 21 | 27 | 19 | 23 | 20 | 24 | 29 | 22 | 18 | 16 | 31 | 30 | 25 | 26 |
| 3 | 37 | 39 | 40 | 33 | 46 | 35 | 44 | 32 | 47 | 41 | 43 | 42 | 34 | 45 | 36 | 38 |
| 4 | 51 | 50 | 52 | 48 | 60 | 63 | 49 | 59 | 61 | 53 | 58 | 62 | 55 | 57 | 56 | 54 |
| 5 | 77 | 78 | 75 | 79 | 76 | 64 | 68 | 72 | 73 | 71 | 69 | 67 | 70 | 74 | 66 | 65 |
| 6 | 89 | 81 | 93 | 83 | 94 | 86 | 92 | 84 | 87 | 85 | 90 | 88 | 82 | 91 | 80 | 95 |
| 7 | 101 | 111 | 106 | 103 | 102 | 109 | 100 | 104 | 110 | 98 | 97 | 105 | 107 | 99 | 108 | 96 |
| 8 | 123 | 122 | 124 | 117 | 121 | 114 | 125 | 116 | 118 | 115 | 113 | 119 | 120 | 126 | 112 | 127 |

FIG. 15B

DATA ENCRYPTION AND DECRYPTION USING DYNAMIC SCREENS AND LOGIC BLOCKS

CROSS REFERENCE TO RELATED APPLICATIONS

This application is a continuation-in-part of and claims priority to U.S. patent application Ser. No. 18/075,792 filed on Dec. 6, 2022, which is incorporated herein by reference in its entirety.

BACKGROUND OF THE INVENTION

1. Field of the Invention

The present invention relates generally to data security and, more specifically, to methods and systems for encrypting data for secure storage or transport while allowing the encrypted data to remain accessible to the appropriate users and systems.

2. Description of Related Art

The sheer volume and accessibility of data has risen rapidly in recent years. Organizations and individual users increasingly look to electronic data as a primary source of information-rather than tangible documents such as paper—because of the persistence, availability, searchability, and accessibility of electronic data. Also, robust networking and communications technologies have made data accessible to user devices in a variety of contexts, including when a user device establishes a remote connection to a primary network that hosts the accessed data. Further, business and legal requirements have demanded the retention and general availability of historic data.

While vast quantities of data are constantly created and persisted, organizations and individual users must have the ability to access the data. The provision of data access does cause a significant actual and perceived risk from data breaches caused by unauthorized users. While access control methods exist to mitigate improper access, the wide variety of methods of data access make it nearly impossible to prevent at least some unauthorized users from accessing data that they should not be able to access. For example, data is routinely saved on network storage, on local devices, on remote storage devices outside a network, and on removable storage devices such as universal serial bus (USB) drives. Because data is often resident in multiple locations with varying degrees of security, there is a persistent risk of improper data access. There are generally no available techniques of ensuring that data stored on disparate media will be secured using a repeated framework. Further, organizations and individual users face business and legal requirements to ensure that their data is secured in the face of these risks.

Conventional methods have attempted to address these problems through the issuance of secret keys that are used to encrypt and decrypt data blocks. For example, the Advanced Encryption Standard (AES) established by the U.S. National Institute of Standards and Technology provides an encryption scheme that uses a fixed block size of 128 bits and a key size of 128, 192, or 256 bits. The key size specifies the number of transformation rounds required to encrypt each data block to provide an acceptable level of data security. Specifically, AES uses 10 transformation rounds for 128-bit keys, 12 transformation rounds for 192-bit keys, and 14 transformation rounds for 256-bit keys. Each transformation round consists of several processing steps, including byte substitution, shifting rows, mixing columns, and round key addition. A set of reverse transformation rounds are applied to decrypt each encrypted data block using the same key.

While conventional methods have provided adequate data security, they lack the ability to provide robust encryption in an efficient manner. For example, the multiple transformation rounds used in AES increase the computational complexity required for the encryption and decryption of data. Also, the encryption and decryption schemes of AES do not provide flexibility to support scalable solutions. Thus, there remains a need in the art for an improved encryption and decryption method that overcomes some or all of the drawbacks associated with existing methods and/or that offers other advantages compared to existing methods.

BRIEF SUMMARY OF THE INVENTION

The present invention is directed to methods and systems for encrypting and decrypting data using dynamic screens and inverse screens, respectively, in combination with logic blocks during an encryption/decryption session. Each encryption scheme includes a series of transformations that convert each data block into an encrypted data block by (a) applying at least one screen in accordance with a bit remapping operation and (b) applying at least one logic block in accordance with a bit modification operation. Each decryption scheme includes a series of transformations that convert each previously-encrypted data block into the original data block by (a) applying at least one inverse screen in accordance with an inverse bit remapping operation and (b) applying the at least one logic block in accordance with the bit modification operation. Preferably, the encryption and decryption schemes each utilize a single round of transformation steps to provide a high level of data security while allowing access to the data by authorized users and systems.

The screens and inverse screens are "dynamic" insofar as the screens are systematically changed within the encryption/decryption session. For example, data block 0 may be encrypted using screen 0, data block 1 may be encrypted using screen 1, data block 2 may be encrypted using screen 2, etc. The various screens are created by (a) generating a fixed number of useable subscreens each of which may be generated dependently (e.g., based on a previously-generated subscreen) or independently (e.g., based on an index subblock) and (b) generating an ordered set of subscreen numbers for each data block (i.e., a subset of the fixed number of subscreens) and assembling those subscreens based on their order in the set to create a full screen for the data block. Preferably, the ordered set of subscreen numbers is different between successive data blocks such that screen 0 is different than screen 1, screen 1 is different that screen 2, etc.

Various embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

Various exemplary embodiments of the present invention are described in detail below with reference to the attached drawing figures, wherein:

FIG. 11 depicts an exemplary LFSR for use in generating dynamic screens;

FIGS. 12A-12B depict the output of the LFSR shown in FIG. 11;

FIG. 13 depicts the ordered sets of subscreen numbers that are generated for a plurality of data blocks based on the LFSR output shown in FIGS. 12A-12B;

FIG. 14 depicts exemplary subscreens that may be used to generate full size screens;

FIGS. 15A-15B depict exemplary screens that may be generated based on the ordered sets of subscreen numbers shown in FIG. 13 and the subscreens shown in FIG. 14;

DETAILED DESCRIPTION OF EXEMPLARY EMBODIMENTS

Figure 1:
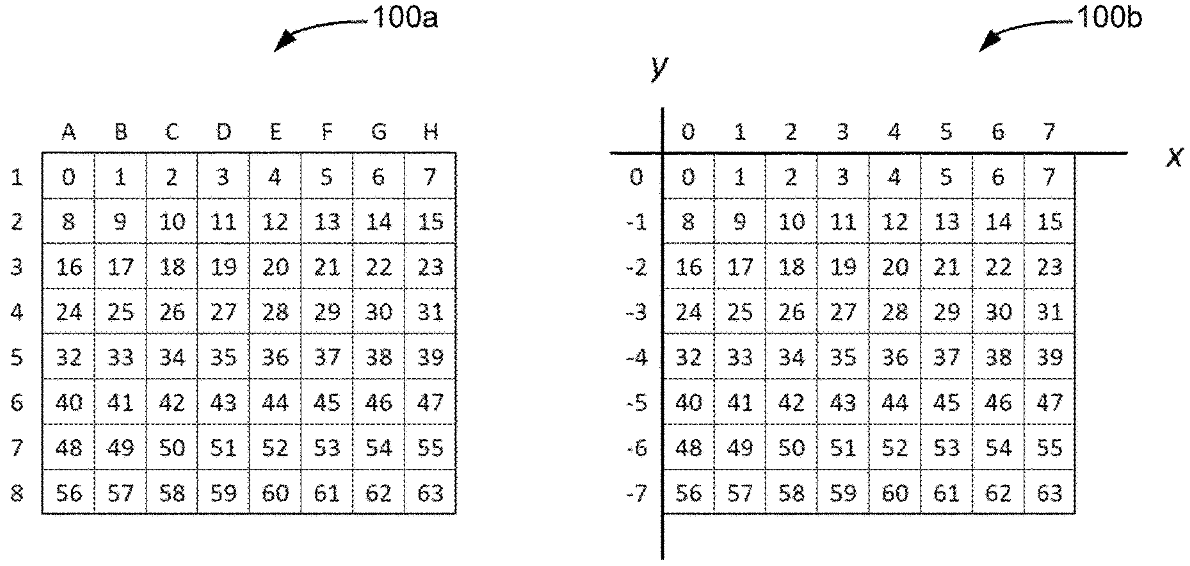
FIG. 1 depicts an index block in which the index positions are referenced with both cell references and index coordinates.

The present invention is directed to methods and systems for encrypting and decrypting data using dynamic screens and inverse screens, respectively, in combination with logic blocks during an encryption/decryption session. While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

I. Encryption and Decryption Schemes

The disclosure provided herein uses various terms to describe the encryption and decryption schemes of the present invention. The meaning of these terms should be understood from the context of the disclosure as further defined in Table 1 below:

TABLE 1

| Term | Definition |
|---|---|
| Binary Object | An object consisting of a tuple of random bits. |
| Bit | A binary digit having a value of 0 or 1. |
| Bit Modification Operation | A logical operation in which first and second input bits determine an output bit. The logical operation is its own inverse to enable use in both a cipher and inverse cipher. Examples of such a logical operation include an XOR logical operation and an XNOR logical operation. |
| Bit Remapping Operation | Transformation used in a cipher that remaps each bit from its current index position to a destination index position. |
| Block | A block-sized tuple of bits positioned within an index block. |
| Block Size | Length or size of a block (in bits), denoted as "B." |
| Cipher | A series of transformations that converts plaintext to ciphertext in accordance with an encryption scheme that applies at least one screen and at least one logic block to each data block. |
| Ciphertext | Data output from a cipher or input to an inverse cipher. |
| Configuration Settings | Algorithm settings that are fixed by policy for a specific implementation and do not vary from session to session. |
| Data Block | A block containing a segment of plaintext. |
| Dependent Subscreens | Subscreens generated such that each useable subscreen uses a previously-generated subscreen as its source. |
| Destinations | The set of preliminary destination index positions calculated using the index coordinates of the source, the movement instructions, and the offset vector. The preliminary destination index positions and the mask are used to determine the final destination index positions. |
| Directional Setup Object | Bits of the private IV. |
| Disposable Subscreen | The first subscreen generated during the subscreen generation process for dependent subscreens, denoted as subscreen X. The source for the disposable subscreen is the index subblock. The disposable subscreen is used as the source for the first useable subscreen. |
| Encrypted Data Block | A block containing a segment of ciphertext. |
| Hash | Input a sequence of bits into a hashing function, such as SHA3-256 or SHA3-512, and receive a corresponding sequence of bits as output. |
| Independent Subscreens | Subscreens generated such that each useable subscreen uses the index subblock as its source. |
| Index Block | A block-sized tuple of index positions. |
| Index Position | An integer representing the position of a specific bit within an index block, denoted as "i." |

TABLE 1-continued

| Term | Definition |
| --- | --- |
| Initialization Vector | Initialization data that provides the initial state for each session, denoted as "IV." |
| Integer Object | An object consisting of a tuple of random, ordered, non-negative decimal integers. |
| Inverse Bit Remapping Operation | Transformation used in an inverse cipher that is the inverse of a bit remapping operation. |
| Inverse Cipher | A series of transformations that converts ciphertext to plaintext in accordance with a decryption scheme that applies at least one inverse screen and at least one logic block to each encrypted data block. |
| Inverse Screen | A block-sized tuple of rearranged index positions for use in performing an inverse bit remapping operation for the inverse cipher. |
| Inverse Subscreen | A subblock-sized subset of an inverse screen. Multiple inverse subscreens are assembled to create an inverse screen. |
| LFSR Object | A binary object used to generate logic blocks, denoted as "LO." |
| Linear-Feedback Shift Register | A shift register in which an output bit is a linear function of its previous state, denoted as "LFSR." |
| Logic Block | A block containing a plurality of bits for use in performing a bit modification operation for the cipher and inverse cipher. Examples of such a block include an XOR block and an XNOR block. |
| Mask | A block containing a plurality of mask bits. The mask is used as an input to the subscreen generation process. |
| Movement Instructions | A set of instructions describing where to move each index position within an index block. The movement instructions are used as an input to the subscreen generation process. |
| Object | A secret, cryptographic tuple of data that may be used by a cipher or inverse cipher. |
| Object Length or Object Size | For a binary object, the length or size of the object in bits. For an integer object, the number of integer elements that comprise the object. |
| Offset Vector | An xy-coordinate that shifts each movement instruction by a fixed amount. The offset vector is used as an input to the subscreen generation process. |
| Parse | Separate a string of binary data into ordered segments to obtain parameters used by the algorithm for a specific session. Segments relating to integer parameters are converted to integers. |
| Plaintext | Data input to a cipher or output from an inverse cipher. |
| Private IV | Data that is derived from the public IV and a binary setup object, which is parsed into parameters and used by the algorithm for a specific session. |
| Public IV | Data that is publicly transmitted with the encrypted data and is unique to a session. |
| Screen | A block-sized tuple of rearranged index positions for use in performing a bit remapping operation for the cipher. |
| Screen Assembly | A process used to generate a single screen from multiple subscreens. |
| Session | An encryption/decryption session. |
| Setup Object | A private object (binary object or integer object) that is used to generate a screen or inverse screen, denoted as "SO." |
| Sources | The set of index positions to place in the final destination index positions during the subscreen generation process. |
| Subblock | A subblock-sized subset of a block. |
| Subblock Size | Length or size of a subblock (in bits), denoted as "R." The subblock size R is a factor of the block size B, such that R = B/x for some positive integer x. |
| Subscreen | A subblock-sized subset of a screen. Multiple subscreens are assembled to create a screen. |

TABLE 1-continued

| Term | Definition |
| --- | --- |
| Subscreen Generation | A process used to generate multiple subscreens from the movement instructions, mask, and offset vector. |
| Tuple | A collection of elements that is ordered (i.e., a sequence) and may have duplicate elements. |
| Usable Subscreens | Subscreens that are available for use in the creation of a screen. The number of useable subscreens is denoted as "Q." |
| XNOR Block | A logic block for use in performing an XNOR logical operation. |
| XNOR Logical Operation | Exclusive-NOR operation. |
| XOR Block | A logic block for use in performing an XOR logical operation. |
| XOR Logical Operation | Exclusive-OR operation. |

As described below, the present invention is implemented on a computing device configured to identify data to be encrypted (i.e., plaintext). For example, data may be identified for encryption if the data is being stored locally or remotely in a context that requires encryption or transported in a context that requires encryption. The context that requires encryption may be based, for example, on a policy associated with one or more of the computing device, a user, an organization, a network, a software application, or any other attributes.

The computing device is configured to divide the identified data into multiple data segments based upon a selected block size (B). It can be appreciated that the number of data segments is dependent on the size of the identified data and the selected block size (B). For example, if the computing device identifies a file of 1 megabyte for encryption and the selected block size (B) is 128 bits, the computing device will divide the file into 62,500 data segments. Exemplary block sizes are 32 bits, 64 bits, 128 bits, 256 bits, 512 bits, 1,024 bits, 2,048 bits, 4,096 bits, 8,192 bits, 16,384 bits, 32,768 bits, 65,536 bits or greater. Of course, other block sizes (B) may be used within the scope of the present invention.

The computing device may also be configured to further divide each data segment into a plurality of smaller data segments based upon a selected subblock size (R). It can be appreciated that the number of smaller data segments is dependent on the selected block size (B) and the selected subblock size (R). For example, if the selected block size (B) is 128 bits and the selected subblock size (R) is16 bits, the computing device will divide each data segment into 8 smaller data segments. Exemplary subblock sizes are 8 bits, 16 bits, 24 bits, 32 bits, 40 bits, 48 bits, 56 bits, 64 bits or greater. Of course, other subblock sizes (R) may be used within the scope of the present invention.

For each data segment identified for encryption, the computing device is configured to project the bits of the data segment into the index positions of an index block to generate a data block. The index block is a virtual structure that identifies a plurality of index positions arranged in a predetermined manner. The virtual structure may comprise a one-dimensional array (i.e., a linear array of data), a two-dimensional array (i.e., data arranged in rows and columns), a three-dimensional array (i.e., an array of two-dimensional arrays), or any other type of data structure known in the art. A single bit or multiple bits (e.g., 8 bits, 16 bits, etc.) may be placed in each index position.

FIG. 1 shows an example of an index block comprising a two-dimensional array with 8 rows and 8 columns to provide 64 index positions. The index positions may be referenced with cell references or index coordinates. Specifically, index block 100*a* includes rows 1-8 and columns A-H, wherein each index position may be referenced by its row and column position within index block 100*a*. Index block 100*b* is situated in Quadrant IV of the rectangular coordinate plane, wherein each index position may be referenced by its xy-coordinate within index block 100*b*. In both cases, the index positions consist of consecutive integers from 0 to 63 starting in the top-left corner and increasing from left to right and then row-wise in carriage-return fashion with 63 in the bottom-right corner. While a 0-based numbering scheme is used in this example, a 1-based numbering scheme could alternatively be used. Index block 100 may be used to create a data block containing 64 bits if a single bit is placed in each index position. Of course, other block sizes and/or number of bits placed in each index position may be used in accordance with the present invention.

The computing device is also configured to implement a cipher comprising a series of transformations that converts plaintext to ciphertext. The cipher utilizes an encryption scheme that applies at least one screen and at least one logic block to each data block—wherein the number and order of application of the screen(s) and logic block(s) will vary depending on the implementation. Each screen is applied in connection with a bit remapping operation that remaps the bits in each data block, and each logic block is applied in connection with a bit modification operation that modifies certain bits in each data block. Preferably, the cipher applies the transformations in a single transformation round.

The computing device is further configured to implement an inverse cipher comprising a series of transformations that converts ciphertext to plaintext. The inverse cipher utilizes a decryption scheme that applies at least one inverse screen and at least one logic block to each previously-encrypted data block—wherein the number and order of application of the inverse screen(s) and logic block(s) will vary depending on the implementation. Each inverse screen is applied in connection with an inverse bit remapping operation that remaps the bits in each encrypted data block, and each logic block is applied in connection with a bit modification operation that modifies certain bits in each encrypted data block. Preferably, the inverse cipher applies the transformations in a single transformation round.

Examples of different encryption and decryption schemes that may be implemented in accordance with the present invention are provided in Table 2 below:

TABLE 2

| Encryption Scheme | Decryption Scheme |
|---|---|
| Step 1: Apply Logic Block | Step 1: Apply Inverse Screen |
| Step 2: Apply Screen | Step 2: Apply Logic Block |
| Step 1: Apply Screen | Step 1: Apply Logic Block |
| Step 2: Apply Logic Block | Step 2: Apply Inverse Screen |
| Step 1: Apply Logic Block Group | Step 1: Apply Inverse Screen |
| Step 2: Apply Screen | Step 2: Apply Logic Block Group |
| Step 1: Apply Screen | Step 1: Apply Logic Block Group |
| Step 2: Apply Logic Block Group | Step 2: Apply Inverse Screen |
| Step 1: Apply Logic Block A | Step 1: Apply Logic Block B |
| Step 2: Apply Screen | Step 2: Apply Inverse Screen |
| Step 3: Apply Logic Block B | Step 3: Apply Logic Block A |
| Step 1: Apply Logic Block Group A | Step 1: Apply Logic Block Group B |
| Step 2: Apply Screen | Step 2: Apply Inverse Screen |
| Step 3: Apply Logic Block Group B | Step 3: Apply Logic Block Group A |

The encryption and decryption schemes shown in Table 2 generate screens/inverse screens that are "dynamic" insofar as the screens are systematically changed within an encryption/decryption session. For example, data block 0 may be encrypted using screen 0, data block 1 may be encrypted using screen 1, data block 2 may be encrypted using screen 2, etc. In some embodiments, the various screens are created by (a) generating a fixed number of useable subscreens each of which may be generated dependently (e.g., based on a previously-generated subscreen) or independently (e.g., based on an index subblock) and (b) generating an ordered set of subscreen numbers for each data block (i.e., a subset of the fixed number of subscreens) and assembling those subscreens based on their order in the set to create a full screen for the data block. Preferably, the ordered set of subscreen numbers is different between successive data blocks such that screen 0 is different than screen 1, screen 1 is different that screen 2, etc. The subscreen generation process and the screen assembly process will be described in greater detail below.

The encryption and decryption schemes shown in Table 2 may apply a single logic block or a logic block group (i.e., two or more logic blocks) and those logic block(s) may be applied before and/or after the screen/inverse screen, as shown. One type of logic block is an XOR block that may be used to perform an XOR logical operation in which the output is true only when the inputs are different. Another type of logic block is an XNOR block that may be used to perform an XNOR logical operation in which the output is true only when the inputs are the same. Notably, the same logic block(s) may be used in both the encryption and decryption schemes—i.e., the bit modification operation performed by each logic block is its own inverse and can be used in both the cipher and inverse cipher as described herein.

It will be seen that the logic blocks are generated from one or more objects, wherein each object is used to generate a logic block for each data block to be encrypted and decrypted during a session. A process for generating logic blocks based on one or more process objects is described in greater detail in U.S. Patent Application Publication No. US2023/0123207, which is incorporated herein by reference in its entirety. A process for generating logic blocks based on one or more linear-feedback shift register (LFSR) objects is described in greater detail in U.S. Patent Application Publication No. US2024/0187209, which is incorporated herein by reference in its entirety.

Figure 2:
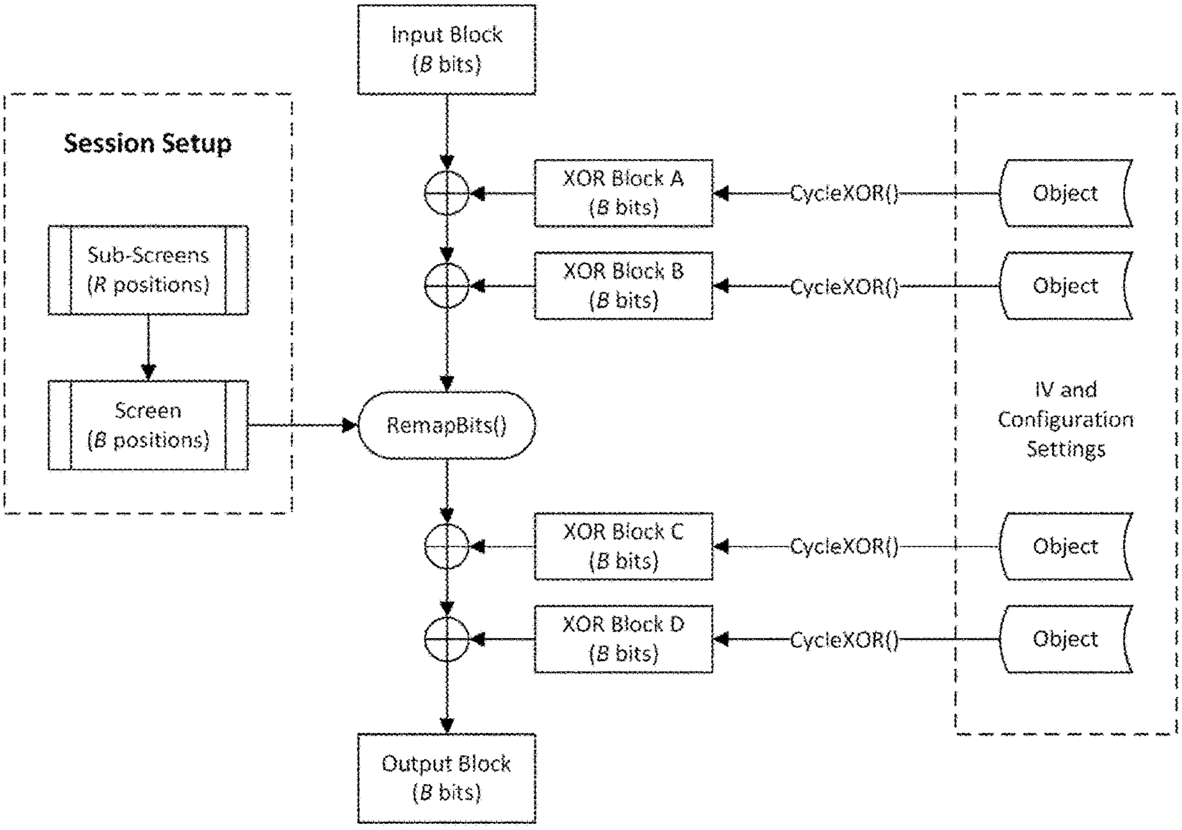
FIG. 2 depicts an encryption scheme of a cipher.

FIG. 2 depicts an exemplary encryption scheme of a cipher that utilizes the following operations: (1) a CycleXOR( ) operation that generates an XOR block from each object for each successive input data block; (2) an AddXOR( ) operation (shown by the XOR symbol ⊕) that adds an XOR block to the input data block or an intermediate state data block using a bitwise XOR logical operation; and (3) a RemapBits( ) operation that applies a screen generated for each successive input data block to an intermediate state data block using a bit remapping operation that may be performed bitwise or bytewise.

In this example, the encryption scheme uses one screen and four XOR blocks i.e., two XOR blocks (XOR block A and XOR block B) are positioned before the RemapBits( ) operation at the front of the cipher and two XOR blocks (XOR block C and XOR block D) are positioned after the RemapBits( ) operation at the back of the cipher. The encryption scheme occurs in one transformation round that includes the following steps: (1) the AddXOR( ) operation adds the front XOR blocks (XOR block A and XOR block B) to the input data block to generate a first intermediate state data block; (2) the RemapBits( ) operation applies the screen to the first intermediate state data block to generate a second intermediate state data block; and (3) the AddXOR( ) operation adds the back XOR blocks (XOR block C and XOR block D) to the second intermediate state block to generate the output data block. The front XOR blocks (XOR block A and XOR block B) may be added to the input data block in any order due to the commutative property of the XOR logical operation. Similarly, the back XOR blocks (XOR block C and XOR block D) may be added to the second intermediate state data block in any order due to the commutative property of the XOR logical operation.

In other embodiments, instead of applying the front XOR blocks (XOR block A and XOR block B) successively in series, XOR block A and XOR block B may be added to create a single equivalent XOR block AB, which is then added to the input data block to generate a first intermediate state data block. Similarly, instead of applying the back XOR blocks (XOR block C and XOR block D) successively in series, XOR block C and XOR block D may be added to create a single equivalent XOR block CD, which is then added to the second intermediate state block to generate the output data block.

Figure 3:
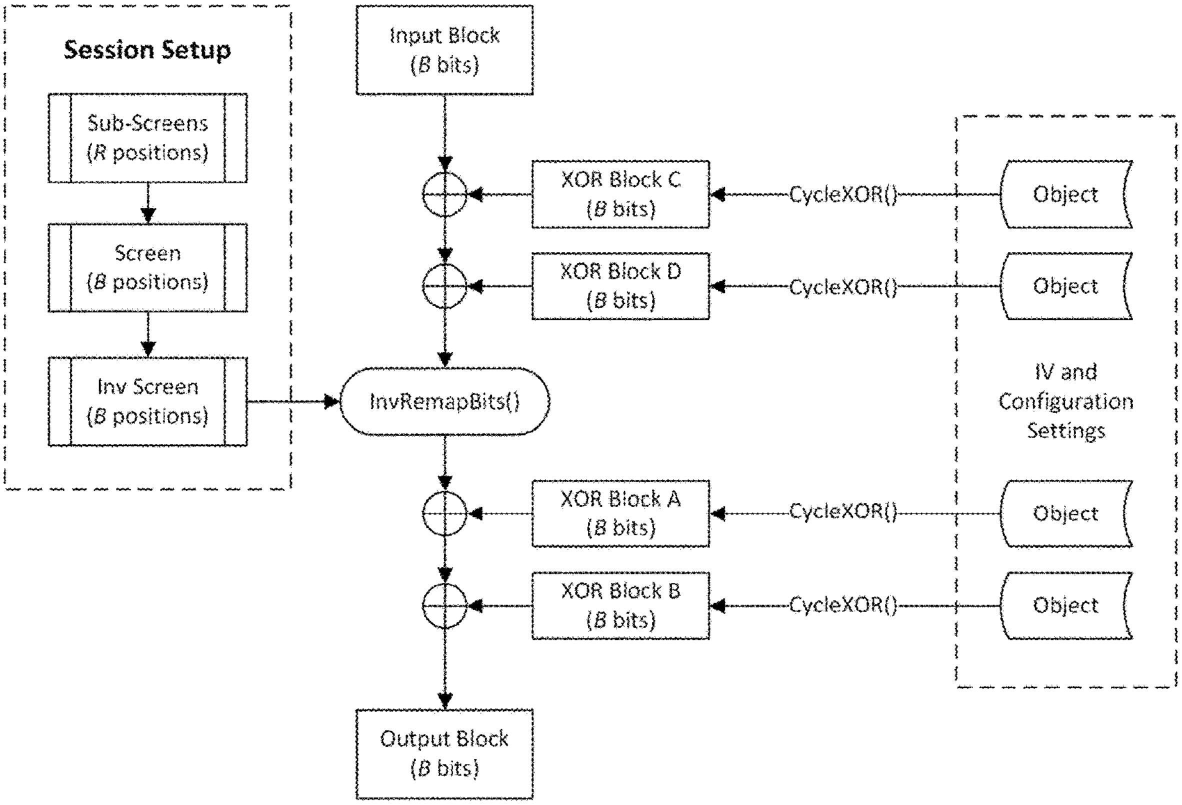
FIG. 3 depicts a decryption scheme of an inverse cipher.

FIG. 3 depicts an exemplary decryption scheme of an inverse cipher that utilizes the following operations: (1) a CycleXOR( ) operation that generates an XOR block for each successive input data block; (2) an AddXOR( ) operation (shown by the XOR symbol ⊕) that adds an XOR block to the input data block or an intermediate state data block using a bitwise XOR logical operation; and (3) an InvRemapBits( ) operation that applies an inverse screen generated for each successive input data block to an intermediate state data block using a bit remapping operation that may be performed bitwise or bytewise.

In this example, the decryption scheme uses one inverse screen and the four XOR blocks used in the encryption scheme—i.e., two XOR blocks (XOR block C and XOR block D) are positioned before the InvRemapBits( ) operation at the front of the inverse cipher and two XOR blocks (XOR block A and XOR block B) are positioned after the InvRemapBits( ) operation at the back of the inverse cipher. Notably, the positions of the front and back XOR blocks are reversed compared to the positions of those same XOR blocks in the encryption scheme.

The decryption scheme occurs in one transformation round that includes the following steps: (1) the AddXOR( ) operation adds the front XOR blocks (XOR block C and XOR block D) to the input data block to generate a first intermediate state data block; (2) the InvRemapBits( ) operation applies the inverse screen to the first intermediate state data block to generate a second intermediate state data block; and (3) the AddXOR( ) operation adds the back XOR blocks (XOR block A and XOR block B) to the second intermediate state block to generate the output data block. The front XOR blocks (XOR block C and XOR block D) may be added to the input data block in any order due to the commutative property of the XOR logical operation. Similarly, the back XOR blocks (XOR block A and XOR block B) may be added to the second intermediate state data block in any order due to the commutative property of the XOR logical operation.

In other embodiments, instead of applying the front XOR blocks (XOR block C and XOR block D) successively in series, XOR block C and XOR block D may be added to create a single equivalent XOR block CD, which is then added to the input data block to generate a first intermediate state data block. Similarly, instead of applying the back XOR blocks (XOR block A and XOR block B) successively in series, XOR block A and XOR block B may be added to create a single equivalent XOR block AB, which is then added to the second intermediate state block to generate the output data block.

Of course, other encryption and decryption schemes that apply at least one screen/inverse screen and at least one logic block—and optionally other types of transformations (including, but not limited to, one or more stumbling blocks as described in U.S. Pat. No. 10,902,142)—will be apparent to one skilled in the art.

The encryption and decryption schemes of the present invention are flexible to allow for the use of multiple different configurations in connection with multiple different implementations. Some settings may be set within the configuration settings and will apply to all sessions for a specific implementation. Other settings may be specified on a session-by-session basis and are contained in an initialization vector (IV) for a specific session. Example settings that may be set in either the configuration settings or the IV include: the block size (B), the subblock size (R), the number of subscreens in a screen (B/R), the number of useable subscreens (Q), the number of logic blocks (N), the logic block generation method, and the IV and setup object size. Other settings will be apparent to one skilled in the art.

The length of an encryption and decryption session may comprise any period of time determined by a particular implementation. For example, a session may begin when a user opens a software application and end when the user closes the software application. As another example, a session may comprise a defined period of time. As yet another example, a session may be determined by the amount of data processed by a computing device—e.g., a session may end when the amount of processed data reaches a predetermined number of bytes. Of course, other ways to determine the length of a session will be apparent to one skilled in the art.

II. Exemplary Embodiments: Encryption And Decryption Schemes with Dynamic Screens and LFSR-Generated XOR Blocks Exemplary embodiments of encryption and decryption schemes that may be implemented in accordance with the present invention will now be described. In some embodiments, the encryption scheme is designed to encrypt each data block via the application of a dynamic screen and four LFSR-generated XOR blocks—two front XOR blocks (XOR block A and XOR block B) and two back XOR blocks (XOR block C and XOR block D). Also, the decryption scheme is designed to decrypt each previously-encrypted data block via the application of a dynamic inverse screen and the four LFSR-generated XOR blocks—two front XOR blocks (XOR block C and XOR block D) and two back XOR blocks (XOR block A and XOR block B). Of course, in other embodiments, XNOR blocks may be used instead of the XOR blocks. The generation of the screens, inverse screens and XOR blocks for the different data blocks will be described below with reference to the components shown in FIG. 4.

A. Configuration Settings

In some embodiments, the configuration settings include the block size (B), the subblock size (R), the number of subscreens in a screen (B/R), the number of useable subscreens (Q), the number of XOR blocks (N), the XOR block generation method, and the initialization vector (IV) and setup object (SO) size. Example values for these configuration settings are shown in Table 3 below (although other values may be used in other embodiments):

TABLE 3

| Block Size (B) | Subblock Size (R) | # Subscreens in Screen (B/R) | # Useable Subscreens (Q) | # XOR Blocks (N) | XOR Block Generation Method | IV and SO Size |
|---|---|---|---|---|---|---|
| 128 bits (8 × 16) | 16 bits (4 × 4) | 8 | 16 | 4 | LFSR | 512 bits |

It should be understood that the configuration settings shown in Table 3 are built into the algorithm and apply to all of the sessions for a specific implementation. Of course, in other embodiments, one or more of these settings could be provided in the initialization vector (IV), described below, so as to be specific to a session.

B. Initialization Vector (IV)

In some embodiments, the encryption and decryption schemes use a public initialization vector (public IV) consisting of a string of cryptographically random bits that is publicly transmitted with the encrypted data and is specific to a session. Since the public IV is not secret, it is transformed to create a private initialization vector (private IV) before usage.

Figure 4:
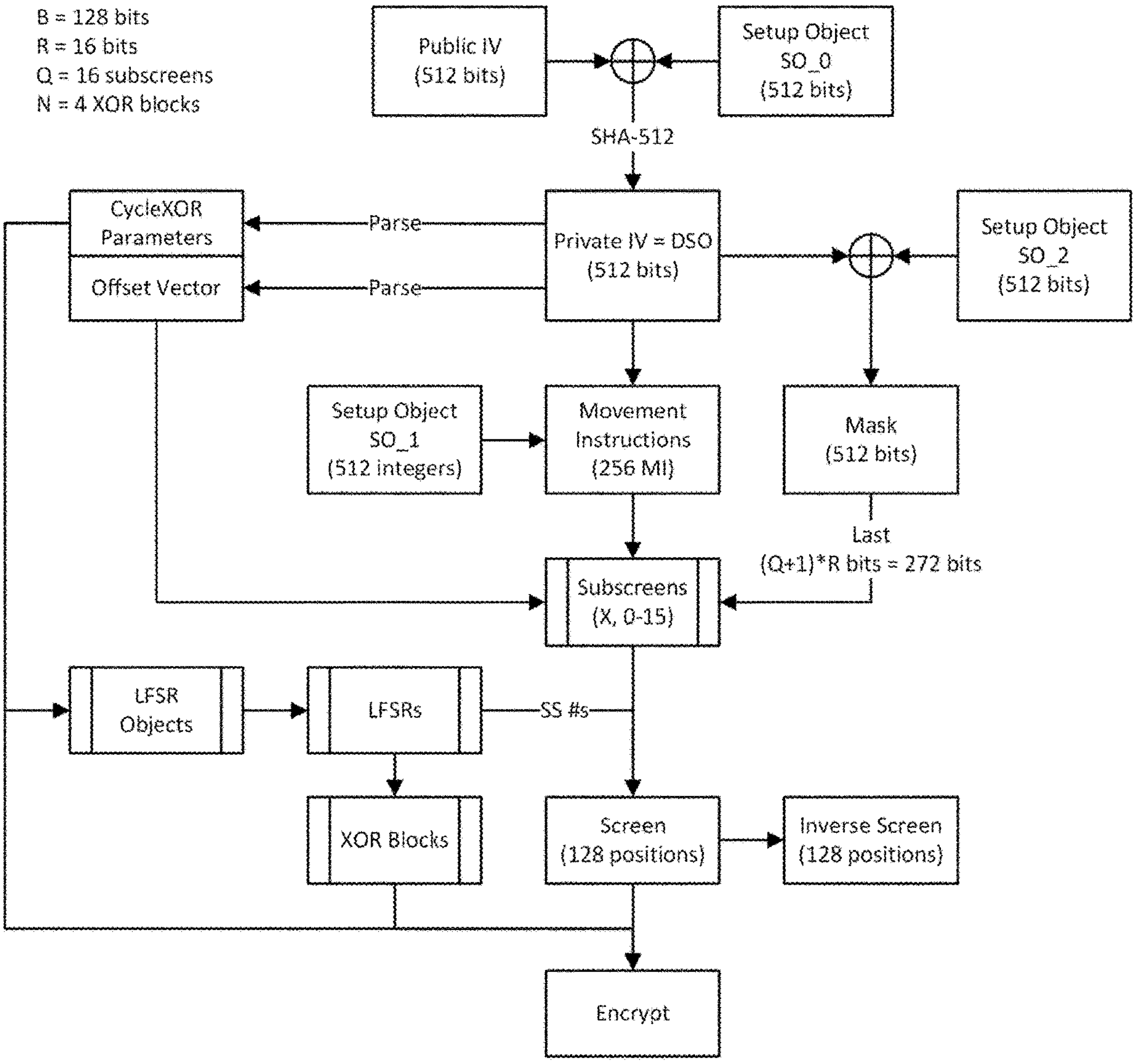
FIG. 4 depicts the components used to generate screens, inverse screens and logic blocks for use in an encryption scheme of a cipher and a decryption scheme of an inverse cipher.

Specifically, as shown in FIG. 4, the private IV is created by implementing an XOR operation in which (a) the inputs to the XOR operation are the public IV and a binary setup object 0 (SO_0) (which is part of a private object group, discussed below) and (b) the output of the XOR operation is provided as an input to a hash function. The XOR operation is implemented on an index position-by-index position basis—e.g., the bit contained in the first index position of the public IV is XOR-ed with the bit in the first index position of the binary setup object 0 (SO_0) to generate the bit in the first index position of the output of the XOR operation, etc. The hash function then applies a cryptographic hash algorithm to the output of the XOR operation and outputs a string of bits comprising the private IV. The hash function may comprise SHA-256 or SHA-512, for example, depending on the selected block size B. In some embodiments, the output of the XOR operation may need to be divided into two or more groups of bits in order to apply the hash function. Of course, other hash functions may be used.

In one embodiment, the public IV comprises a sequence of bits having a length of 4B, the binary setup object 0 (SO_0) comprises a sequence of bits having a length of 4B, and the resultant private IV comprises a sequence of bits having a length of 4B. Of course, the public IV, binary setup object 0 (SO_0), and private IV may have other lengths within the scope of the present invention.

As shown in FIG. 4, the private IV is used as a directional setup object (DSO) and is also parsed into various segments to generate the following components: (1) an offset vector and (2) a plurality of LFSR object parameters for each XOR block. It will be seen that the DSO and offset vector are used in the subscreen generation process to ultimately create the screen, and the LFSR object parameters specify the parameters used in the logic block generation process to ultimately create XOR block A, XOR block B, XOR block C, and XOR block D for each of the data blocks.

In one embodiment, the DSO consists of all of the bits of the private IV and, thus, has a length of 4B. In other embodiments, if all of the bits of the private IV are not needed for the DSO, the DSO may consist of a portion of the bits of the private IV (e.g., a fixed number of bits at the beginning or end of the private IV).

In one embodiment, the offset vector consists of two integers (p,q). For a subblock having a size R with m rows and n columns, the two integers (p,q) of the offset vector may be expressed as follows:

$$p \in \mathbb{Z} : 0 \le p < n$$

$$q \in \mathbb{Z} : -m < q \le 0$$

In one embodiment, the LFSR object parameters include an LFSR object (LO_n), an initial shift (δ), a seed length (λ), and a rate (ρ) for each of the XOR blocks, as described below:

1. LFSR Object: The specific LFSR object (LO_n) from which the bits shall be retrieved to populate the seed used to generate the XOR block. As described below, the seed is the initial value of the LFSR.
2. Seed Length: The seed length (λ) is the length of the seed used to generate the XOR block. The seed length (λ) is a distinct integer greater than the block size B (e.g., B+1, B+2, B+3, B+4, etc.).
3. Initial Shift: The initial shift (δ) is the amount of shift required to identify the index position of the first bit of a λ-length sequence of bits of the LFSR object that will be used to populate the seed.
4. Rate: The rate (ρ) is the number of "steps" that the LFSR progresses for each data block processed. The rate (ρ) is a positive integer that may be between the subblock size R and the block size B, or may be greater than the block size B. The same rate (ρ) may be used for all LFSRs, or, the rate (ρ) may vary between different LFSRs. Various implementations will be apparent to one skilled in the art.

An example set of LFSR object parameters for a block size B of 128 bits and an XOR block quantity (N) of 4 is shown in Table 4 below (although other values may be used in other embodiments):

TABLE 4

| XOR Block | LFSR Object | Seed Length (λ) | Initial Shift (δ) | Rate (ρ) |
|---|---|---|---|---|
| A | LO_0 | 129 | 199 | 16 |
| B | LO_2 | 130 | 42 | 16 |
| C | LO_3 | 131 | 252 | 16 |
| D | LO_1 | 132 | 18 | 16 |

In one embodiment, a parsing scheme is implemented in which all of the bits of the private IV are used as the DSO, and, specified bits of the private IV are used to create the p-component and q-component of the offset vector and the LFSR object parameters for each of the four XOR blocks. An example parsing scheme is shown in Table 5 below:

TABLE 5

| Applies To | Parameter | Segment Length | Private IV Start Bit # | Private IV End Bit # |
|---|---|---|---|---|
| Screen | DSO | 512 | 0 | 511 |
| Screen | Offset Vector, p-component | 2 | 0 | 1 |
| Screen | Offset Vector, q-component | 2 | 2 | 3 |
| XOR Block A | LFSR Object (LO_n) | 3 | 4 | 6 |
| XOR Block A | Initial Shift (δ) | 9 | 7 | 15 |
| XOR Block A | Seed Length (λ) | 3 | 16 | 18 |
| XOR Block A | Rate (ρ) | 3 | 19 | 21 |
| XOR Block B | LFSR Object (LO_n) | 3 | 22 | 24 |
| XOR Block B | Initial Shift (δ) | 9 | 25 | 33 |
| XOR Block B | Seed Length (λ) | 3 | 34 | 36 |
| XOR Block B | Rate (ρ) | 3 | 37 | 39 |
| XOR Block C | LFSR Object (LO_n) | 3 | 40 | 42 |
| XOR Block C | Initial Shift (δ) | 9 | 43 | 51 |
| XOR Block C | Seed Length (λ) | 3 | 52 | 54 |
| XOR Block C | Rate (ρ) | 3 | 55 | 57 |
| XOR Block D | LFSR Object (LO_n) | 3 | 58 | 60 |
| XOR Block D | Initial Shift (δ) | 9 | 61 | 69 |
| XOR Block D | Seed Length (λ) | 3 | 70 | 72 |
| XOR Block D | Rate (ρ) | 3 | 73 | 75 |

It should be understood that the specified bits of the private IV that are used to create the p-component and q-component of the offset vector and the LFSR object parameters for each of the four XOR blocks, as set forth in Table 5, are converted to an integer in order to provide the designated component or parameter. Also, the integer for each rate parameter is used to access a lookup table that provides a plurality of integers and associated LFSR rates—i.e., the integer is used to determine the actual rate (ρ) of the LFSR. It should be understood that the rate (ρ) of the LFSR may alternatively be set in the configuration settings and not parsed from the private IV. Of course, other parsing schemes will be apparent one skilled in the art and may be used within the scope of the present invention.

Other LFSR object parameters may also be set in the configuration settings (or optionally parsed from the private IV), including:

1. Position: The position of the XOR block within the cipher—e.g., an XOR block may have a position before the screen at the front of the cipher or a position after the screen at the back of the cipher. Preferably, the number of XOR blocks is an even number such that half of the XOR blocks may be positioned at the front of the cipher and the other half of the XOR blocks may be positioned at the back of the cipher. The configuration settings may specify the approach for determining the position of each XOR block. For example, the number of the LFSR object (LO_n) may determine the position of each XOR block (e.g., even-numbered XOR blocks may be positioned at the front of the cipher and odd-numbered XOR blocks may be positioned at the back of the cipher). Other approaches for determining the position of each XOR block will be apparent to one skilled in the art.
2. LFSR Direction: An XOR block generated from an LFSR will be referred to as either a "forward" XOR block or a "reverse" XOR block, as described below. In embodiments where multiple XOR blocks are used on each side of the screen, the XOR blocks may be generated by operation of their corresponding LFSRs in the same direction or in opposing directions. For example, if there are two XOR blocks (XOR block A and XOR block B) at the front of the cipher and two XOR blocks (XOR block C and XOR block D) at the back of the cipher, XOR blocks A and C may be generated by operation of their corresponding LFSRs in the forward direction and XOR blocks B and D may be generated by operation of their corresponding LFSRs in the reverse direction (or vice versa). Alternatively, XOR blocks A, B, C and D may all be generated by operation of their corresponding LFSRs in the same direction. The configuration settings may specify the LFSR direction.
3. Tap Bit Positions: The index positions of the tap bits that affect the calculation of the next output of the LFSR. The tap combination selected for each LFSR may be based on a primitive polynomial relative to the seed length (λ) such that the maximum number of unique permutations may be generated. The number of permutations related to the taps should preferably exceed the desired maximum number of data blocks that need to be securely processed in a session. The optimal tap combinations are preferably pre-selected for each allowable seed length (λ) and set in the configuration settings.

It should be understood that any of the LFSR object parameters discussed above may be parsed from the private IV or set in the configuration settings within the scope of the present invention.

C. Private Object Group

In some embodiments, the encryption and decryption schemes use a private object group that include two object sets—a setup object set for use in connection with the subscreen generation process and an LFSR object set for use in connection with the logic block generation process. The setup object set includes a binary setup object 0 (SO_0), an integer setup object 1 (SO_1), and a binary setup object 2 (SO_2). The LFSR object set includes one or more LFSR objects ((LO_0, LO_1, etc.), as described below. Each object consists of a sequence of cryptographically random bits or integers.

In one embodiment, the binary setup object 0 (SO_0) comprises a sequence of bits having a length of 4B and, as described above, is used to transform the public IV into the private IV. The integer setup object 1 (SO_1) comprises a sequence of positive integers having a length of 4B, wherein the integers preferably cover the entire range of possible integer values with equal probability. For a subblock having a size R with m rows and n columns, the integer setup object 1 (SO_1) may be expressed as follows:

$$\text{For odd } i\text{: } 0 \le SO\_1_i < n$$

$$\text{For even } i\text{: } 0 \le SO\_1_i < m$$

The binary setup object 2 (SO_2) comprises a sequence of bits having a length of 4B.

It should be understood that the setup objects may have object sizes that are smaller or larger than those specified above. For example, some embodiments may use larger object sizes when it is desirable to maintain flexibility in order to enable the utilization of multiple different block sizes. In that case, only a portion of the bits or integers in the sequence will be considered to be SO_n for use in connection with the subscreen generation process.

In one embodiment, each LFSR object has the same size and comprises a sequence of bits having a length that is greater than the maximum LFSR seed length (λ) identified in the LFSR object parameters. The number of LFSR objects in the LFSR object set is preferably equal to or greater than the number of XOR blocks to be generated for each of the data blocks. For example, in this embodiment, there are eight LFSR objects (LO_0, LO_1, LO_2, LO_3, LO_4, LO_5, LO_6, and LO_7), but the encryption and decryption schemes only require the generation of four XOR blocks for each of the data blocks (XOR block A, XOR block B, XOR block C, and XOR block D). As such, only four of the eight LFSR objects will be used to create the XOR blocks as determined by the specific LFSR objects (LO_n) identified in the LFSR object parameters. Each of the four LFSR objects is altered using the initial shift (δ) and seed length (λ) for that LFSR object as identified in the LFSR object parameters and is used to create a plurality of XOR blocks—one for each of the data blocks, as described below. Of course, in other embodiment, the number of LFSR objects may be the same as the number of XOR blocks needed for each of the data blocks (or even fewer LFSR objects may be used in implementations that require potentially lower security).

In some embodiments, the object sets are assigned by an organization, software manufacturer, or other third party. For example, the Information Technology (IT) department of an organization could assign the object sets to each employee when issuing a computing device for use at the organization. As another example, a software manufacturer could provide the object sets associated with the operating system (OS) installed on a computing device, wherein the computing device may not be used without those object sets. Thus, the objects in the object sets are private objects that may be used across different sessions. It should be understood that the object sets could be stored on the computing device or on a storage device separate from the computing device.

D. Generation of Logic Blocks

In some embodiments, the LFSR object set and LFSR object parameters described above are used to generate a unique set of logic blocks for each of the data blocks to be processed during a session. Each logic block is created using specific bits from a specific output step of its related LFSR—e.g., logic block A gets its bits from LFSR A, logic block B gets its bits from LFSR B, logic block C gets its bits from LFSR C, and logic block D gets its bits from LFSR D.

In one embodiment, each LFSR (e.g., any one of LFSRs A, B, C or D) is used to generate a unique logic block for each of the data blocks as follows:

1. An LFSR seed is populated from consecutive bits of the LFSR object, wherein the number of bits is equal to the specified LFSR seed length (λ). The consecutive bits start at the index position identified by the initial shift (δ) of the LFSR object. If there are insufficient bits remaining between the start bit position and the end of the LFSR object, the process will wraparound to the beginning of the LFSR object.
2. The LFSR seed provides the initial state of the LFSR—step zero. For each subsequent LFSR step, the specified tap bits of the previous step are combined using an XOR operation (or alternatively an XNOR operation) to generate one new output bit that is placed into index position 0. The bits are then shifted one index position to generate the bits placed into the remaining index positions.
3. After a number of steps equal to the LFSR rate (ρ), the LFSR output is truncated to B bits (bits 0 through B-1 of the LFSR output) to create a logic block.

In order to illustrate the steps outlined above, example LFSRs are shown in FIGS. 5A-5D in which the block size (B) is 16, the LFSR seed length (λ) is 18, the tap bit positions are 10 and 17, and the LFSR rate (ρ) is 4. It should be understood that these parameters are smaller than those shown in Table 4 in order to simplify the illustration.

Figure 5A:
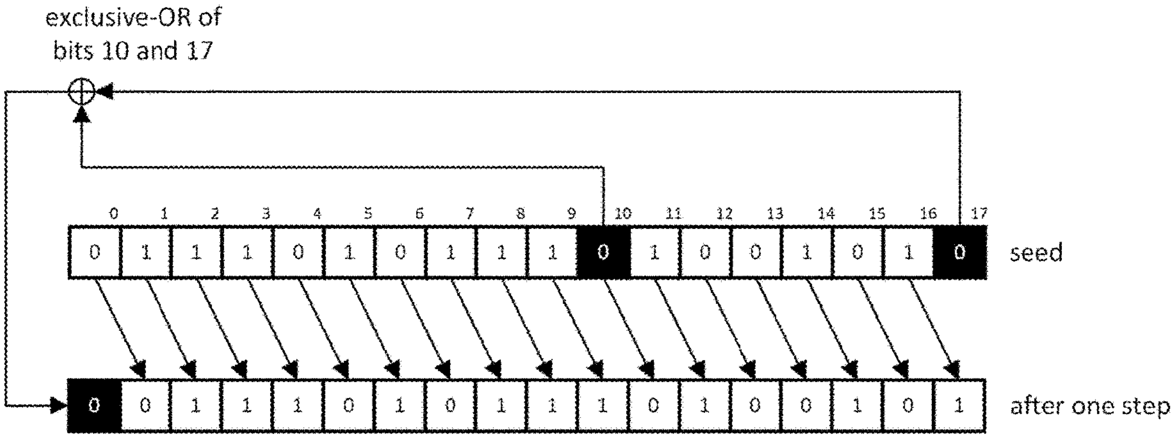
FIGS. 5A-5D depict exemplary LFSRs for use in generating logic blocks.

FIG. 5A illustrates an exemplary seed and first output. In this example, the seed bits are provided in index position order, with the Least-Significant Bit (i=0) on the left end of the seed and the Most-Significant Bit (i=λ−1) on the right end of the seed. The bits in index positions 10 and 17 of the seed (i.e., the tap bits) are combined using an XOR operation to generate one new output bit that is placed in index position 0 of the first output. The bits in index positions 0 to 16 of the seed are shifted one index position, as shown, to create the bits in index positions 1 to 17 of the first output.

Figure 5B:
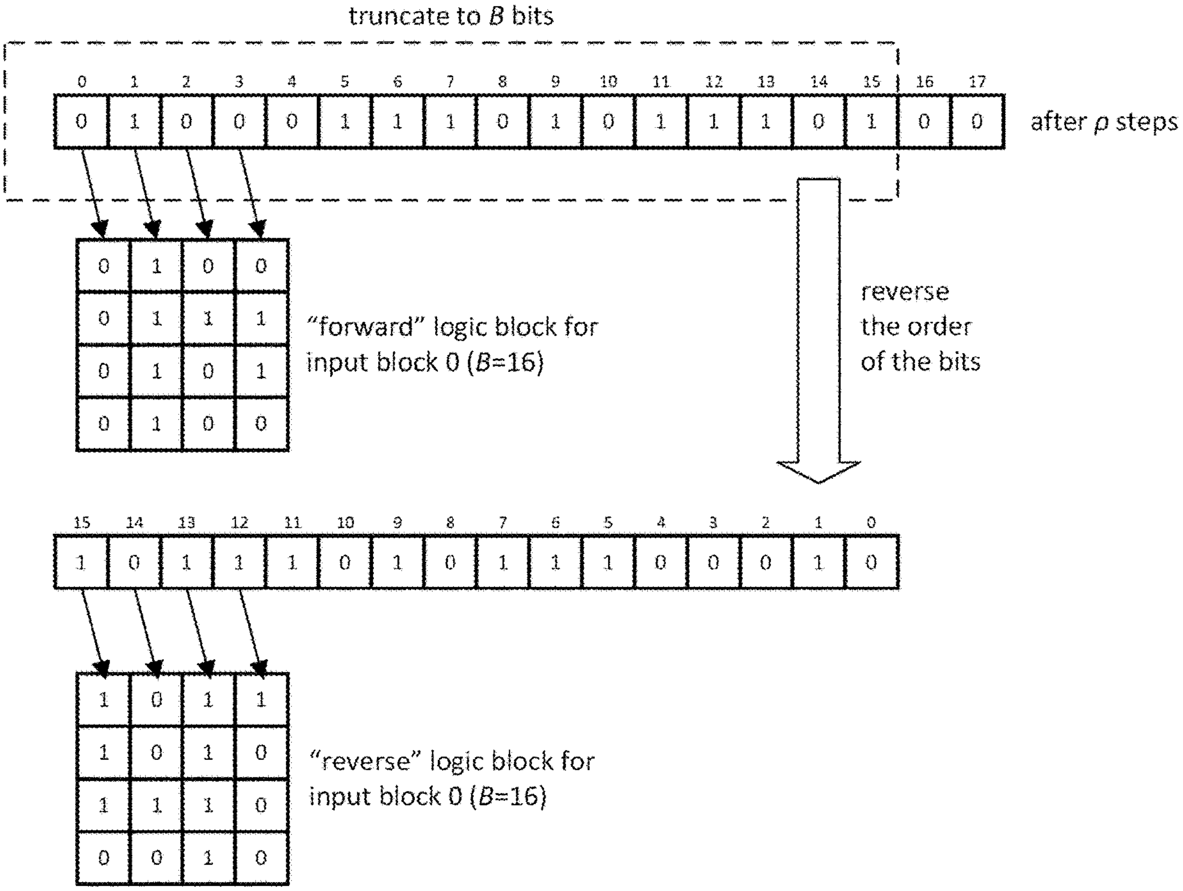

FIG. 5B illustrates the output after the number of steps designated by the LFSR rate (ρ) (in this example, the LFSR rate (ρ) is 4). To generate a "forward" logic block, the 18-bit output is truncated to 16 bits, and those 16 bits form the bits of the logic block used to process the first data block (i.e., input block 0), as shown. To generate a "reverse" logic block, the 18-bit output is truncated to 16 bits, and those 16 bits are mirrored or reversed to form the bits of the logic block used to process the first data block (i.e., input block 0), as shown.

It should be understood that the process shown in FIGS. 5A and 5B will continue until a logic block is created for each of the data blocks to be processed during a session.

Figure 5C:
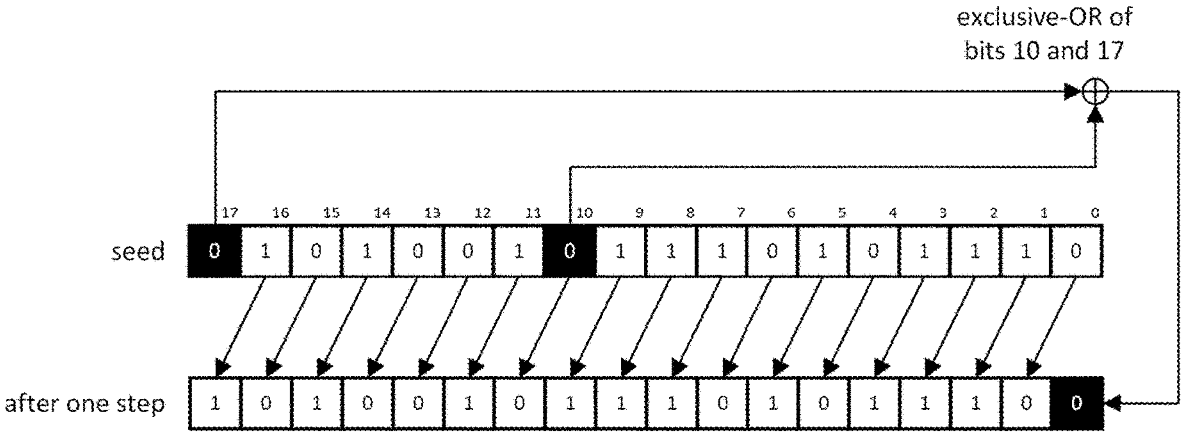

FIG. 5C illustrates another exemplary seed and first output. In this example, the seed bits are provided in reverse index position order, with the Most-Significant Bit (i=λ−1) on the left end of the seed and the Least-Significant Bit (i=0) on the right end of the seed. The bits in index positions 10 and 17 of the seed (i.e., the tap bits) are combined using an XOR operation to generate one new output bit that is placed in index position 0 of the first output. The bits in index positions 0 to 16 of the seed are shifted one index position, as shown, to create the bits in index positions 1 to 17 of the first output.

Figure 5D:
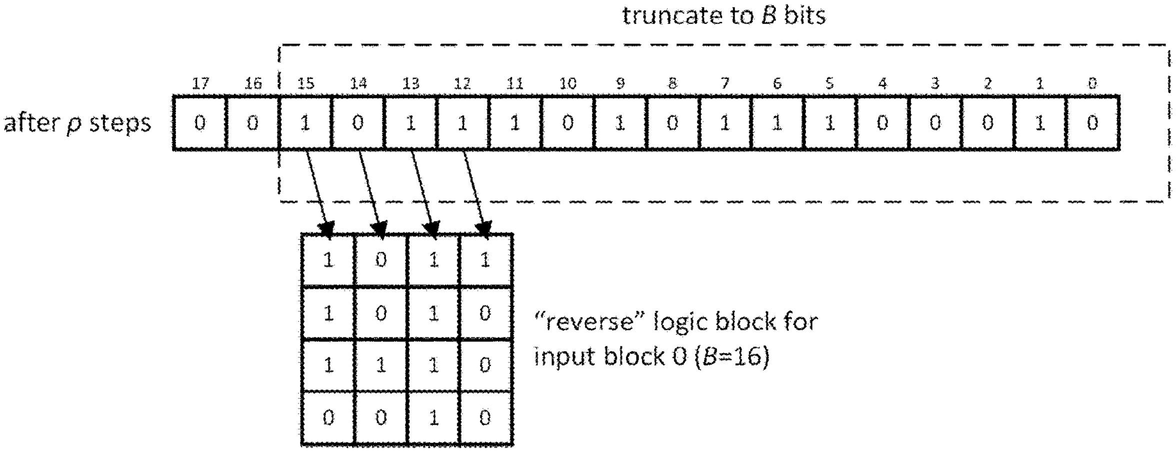

FIG. 5D illustrates the output after the number of steps designated by the LFSR rate (ρ) (in this example, the LFSR rate (ρ) is 4). To generate a "reverse" logic block, the 18-bit output is truncated to 16 bits, and those 16 bits form the bits of the logic block used to process the first data block (i.e., input block 0), as shown. It should be noted that this logic block is the same as the "reverse" logic block shown in FIG. 5B. Thus, it can be appreciated that a "reverse" logic block may be generated by either method—i.e., reversing the order of the output bits or reversing the order of the seed bits.

E. Generation of Dynamic Screens and Inverse Screens

In some embodiments, the public IV and private setup object set described above are used to generate dynamic screens and inverse screens for the data blocks to be processed during a session. The screens and inverse screens are "dynamic" insofar as the screens are systematically changed within the session. For example, data block 0 may be encrypted using screen 0, data block 1 may be encrypted using screen 1, data block 2 may be encrypted using screen 2, etc. It will be seen that each screen provides a set of remapping instructions that identifies a correspondence between a plurality of original index positions and a plurality of destination index positions within an index block.

In this embodiment, the dynamic screens and inverse screens for the different data blocks are created in accordance with the following processes:

1. Subscreen Generation Process: This process is used to generate a fixed number of subscreens each of which may be generated dependently or independently. The subscreens each have a subblock size R and are generated from a source set of index positions, a set of movement instructions, the offset vector derived from the private IV (discussed above), and a mask.
2. Screen Assembly Process: This process is used to generate an ordered set of subscreen numbers for each data block—i.e., a number (x) of the fixed number of subscreens generated in the subscreen generation process—and assemble those subscreens based on their order in the set to create a full screen of block size B for the data block. Preferably, the ordered set of subscreen numbers is different between successive data blocks such that screen 0 is different than screen 1, screen 1 is different that screen 2, etc.

The subscreen generation and screen assembly processes will be described in greater detail below.

1. Subscreen Generation Process

At the beginning of a session, the subscreen generation process is used to generate a fixed number of subscreens in excess of the number of subscreens needed to create a screen for any given data block. The subscreens may be generated dependently or independently, as described below.

a. Dependent Subscreens

In some embodiments, the subscreens are generated dependently—i.e., the generation of each subscreen is dependent on a source comprising the index positions of a previously-generated subscreen (except for the first-generated subscreen in which the source comprises the index positions of an index subblock).

In one embodiment, the total number of subscreens to be generated may be expressed as follows:

$$\text{Total Subscreens} = Q + 1$$

where:

$$Q = 2 * \frac{B}{R}$$

The total number of subscreens includes 1 disposable subscreen (the first-generated subscreen) and a number (Q) of useable subscreens that are available for use in the creation of the screens for the various data blocks. As an example, for a block size B of 128 bits and a subblock size R of 16 bits, there would be 17 subscreens generated during session setup—i.e., 1 disposable subscreen and 16 useable subscreens. In other embodiments, the first-generated subscreen may be used as a useable subscreen in which case one less subscreen would be generated during session setup. Of course, the number (Q) of useable subscreens may be greater than or less than 2*B/R in other embodiments.

It will be seen that the index subblock serves as the source for the generation of the disposable subscreen, referred to as subscreen X. Subscreen X serves as the source for the generation of the first useable subscreen, subscreen 0, and then subscreen X is discarded. Each useable subscreen serves as the source for the generation of the next useable subscreen—for example, subscreen 0 serves as the source for subscreen 1, subscreen 1 serves as the source for subscreen 2, etc. The process for generating dependent subscreens will be described in greater detail below in connection with FIGS. 9A-9C.

In some embodiments, and with reference to FIG. 4, the subscreen generation process includes the following steps: (1) generate a set of movement instructions; (2) generate a mask; and (3) generate each of the dependent subscreens based on a source set of index positions, the movement instructions, the p-component and q-component of the offset vector, and the mask. Each of these steps will be described in greater detail below.

Figure 6:
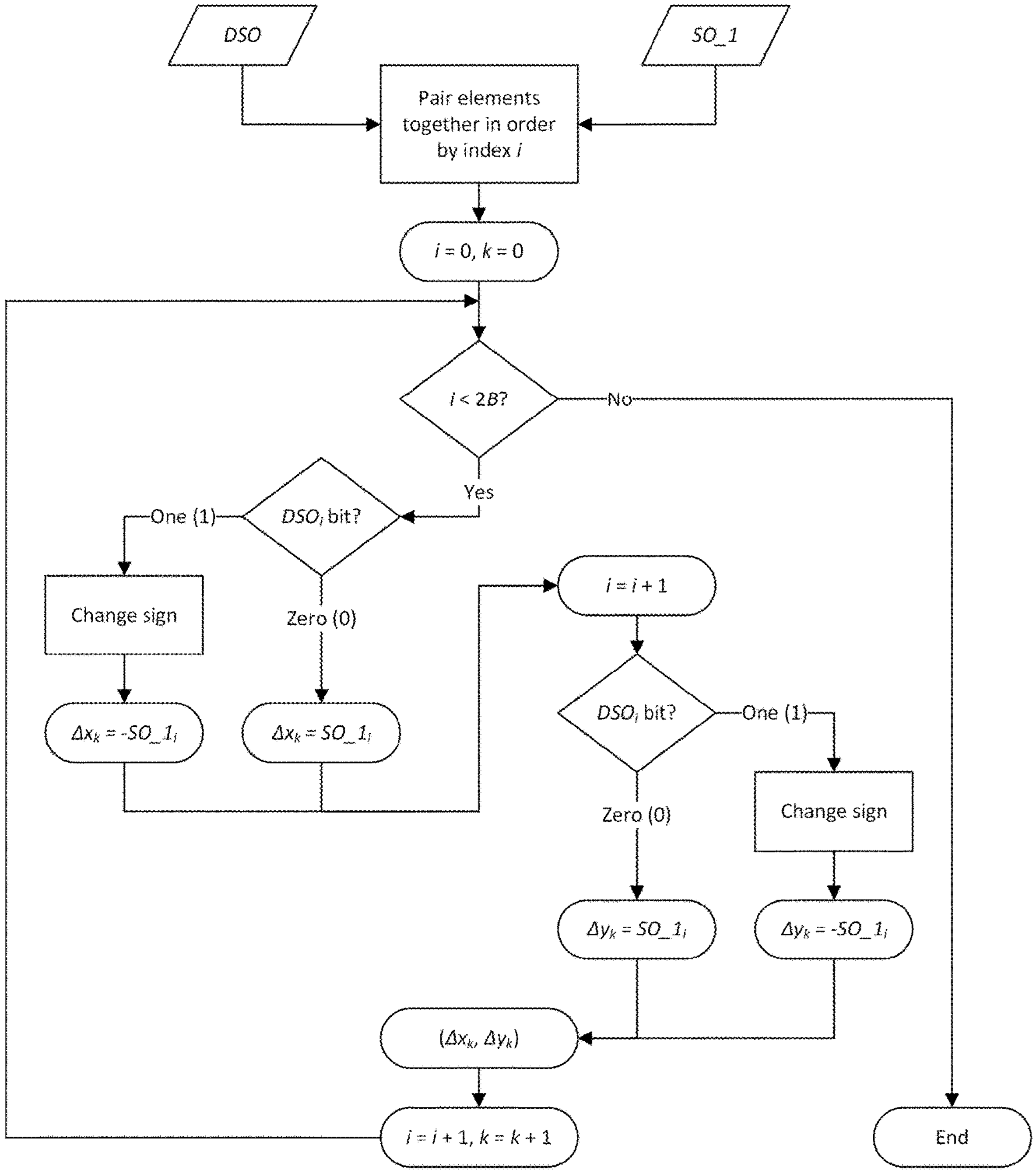
FIG. 6 depicts a process for generating movement instructions.

First, the movement instructions are generated in accordance with the flow chart shown in FIG. 6. As can be seen, the bits of the DSO derived from the private IV (discussed above) and the integers of the integer setup object 1 (SO_1) are paired together by index position. Examples of four such pairings are shown in Table 6 below:

TABLE 6

| Index Position (i) | 0 | 1 | 2 | 3 |
|---|---|---|---|---|
| DSO | 0 | 1 | 0 | 1 |
| SO_1 | 7 | 6 | 1 | 2 |

As shown in the flow chart, two successive pairings are interpreted as a movement instruction representing a shift in each direction for a particular index position, denoted as (Δx, Δy). The bit of the DSO determines the direction of movement (e.g., a bit of "0" is positive and a bit of "1" is negative, or vice-versa) and the corresponding integer value of the integer setup object 1 (SO_1) determines how many positions to move in that direction.

Figure 7:
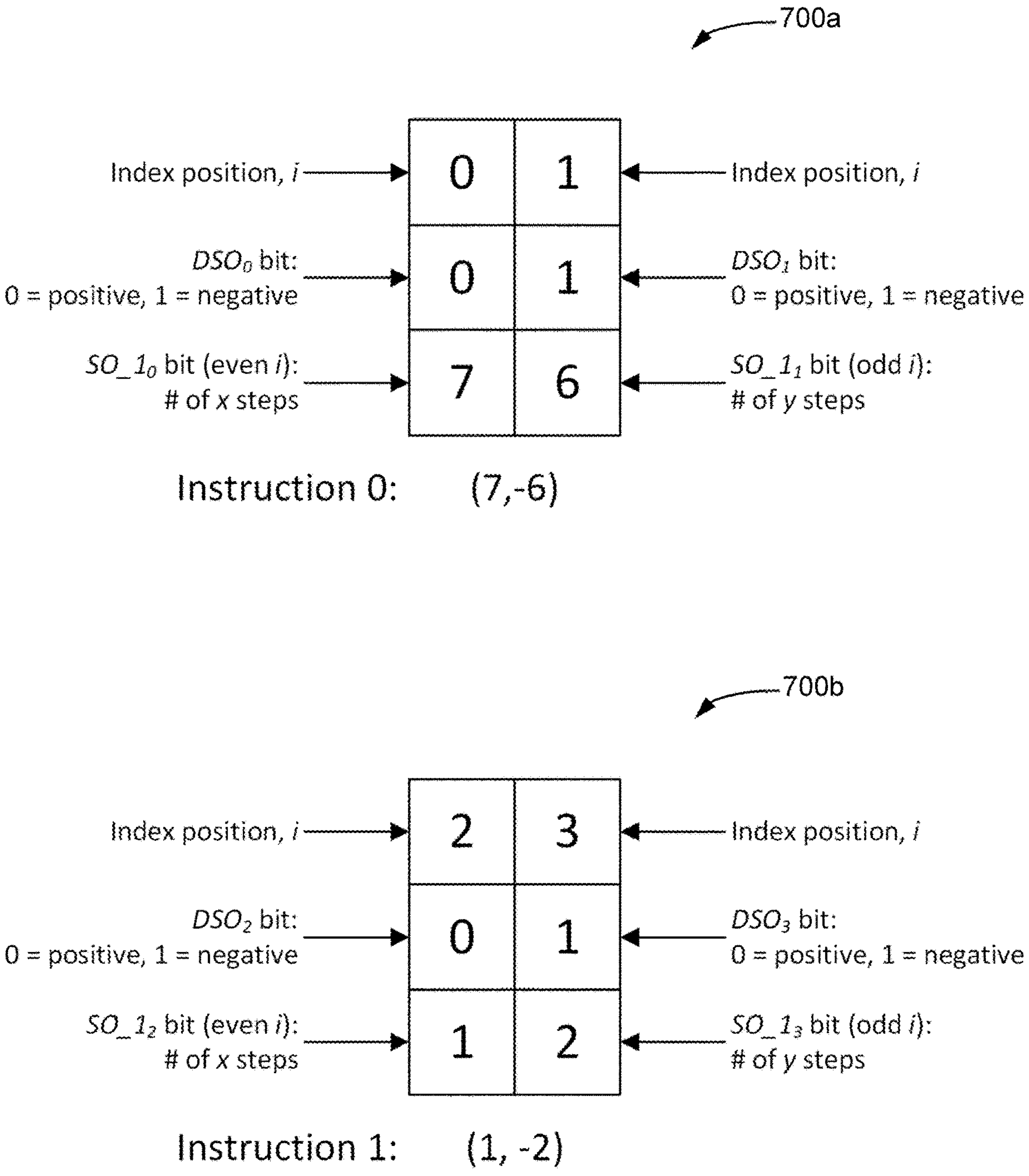
FIG. 7 depicts exemplary movement instructions that are generated using the process of FIG. 6.

Two exemplary movement instructions corresponding to the four pairings of Table 6 are shown in FIG. 7 as reference numbers 700*a* and 700*b*. As can be seen, the bit of $DSO_0$ (i.e., a "0" bit) and the integer of $SO\_1_0$ (i.e., the integer "7") are converted to a Δx of 7, and the bit of $DSO_1$ (i.e., a "1" bit) and the integer of $SO\_1_1$ (i.e., the integer "6") are converted to a Δy of −6. Thus, movement instruction 0 is (7, −6), indicating that the input index position should move right 7 positions and down 6 positions within the index block. Similarly, the bit of $DSO_2$ (i.e., a "0" bit) and the integer of SO_12 (i.e., the integer "1") are converted to a Δx of 1, and the bit of $DSO_3$ (i.e., a "1" bit) and the integer of $SO\_1_3$ (i.e., the integer "2") are converted to a Δy of −2. Thus, movement instruction 1 is (1, −2), indicating that the input index position should move right 1 position and down 2 positions within the index block. This process continues until all the bits of the DSO and all the integers of integer setup object 1 (SO_1) have been converted to movement instructions as described above. Thus, if the DSO consists of 4B bits and the integer setup object 1 (SO_1) consists of 4B integers, there will be 2B movement instructions. It should be understood that the movement instructions provide the initial remapping instructions for each of the index positions in terms of horizontal and vertical movement.

Second, the mask is generated by implementing an XOR operation in which (1) the inputs to the XOR operation are the DSO and the binary setup object 2 (SO_2) and (2) the output of the XOR operation is the mask. It can be appreciated that the XOR operation is applied on an index position-by-index position basis—e.g., the bit contained is the first index position of the DSO is XOR-ed with the bit in the first index position of the binary setup object 2 (SO_2) to generate the bit in the first index position of the mask, etc. Thus, if the if the DSO consists of 4B bits and the binary setup object 2 (SO_2) consists of 4B bits, the mask will consist of a sequence of 4B mask bits. A portion of the sequence of mask bits are then used to create a plurality of subscreen masks each with a subblock size R. For example, if there are 512 mask bits and the subblock size R is 16 bits, the last 272 mask bits in the sequence may be used to generate 17 subscreen masks—i.e., 1 subscreen mask for the disposable subscreen X and 16 subscreen masks for the 16 useable subscreens, as described below. Of course, other portions of the sequence of mask bits may be used to generate the subscreen masks within the scope of the present invention.

It should be understood that the mask generation method described above may be modified in other embodiments. For example, in some embodiments, the binary setup object 2 (SO_2) is not included in the private object group and the 4B bits of the binary setup object 0 (SO_0) are used in its place to generate the mask. Also, in some embodiments, the size of the binary setup object 2 (SO_2) is less than the size of the DSO, in which case the end bits of the DSO are XOR-ed with the bits of the binary setup object 2 (SO_2) to generate the mask. Other embodiments will be apparent to one skilled in the art.

Figure 8:
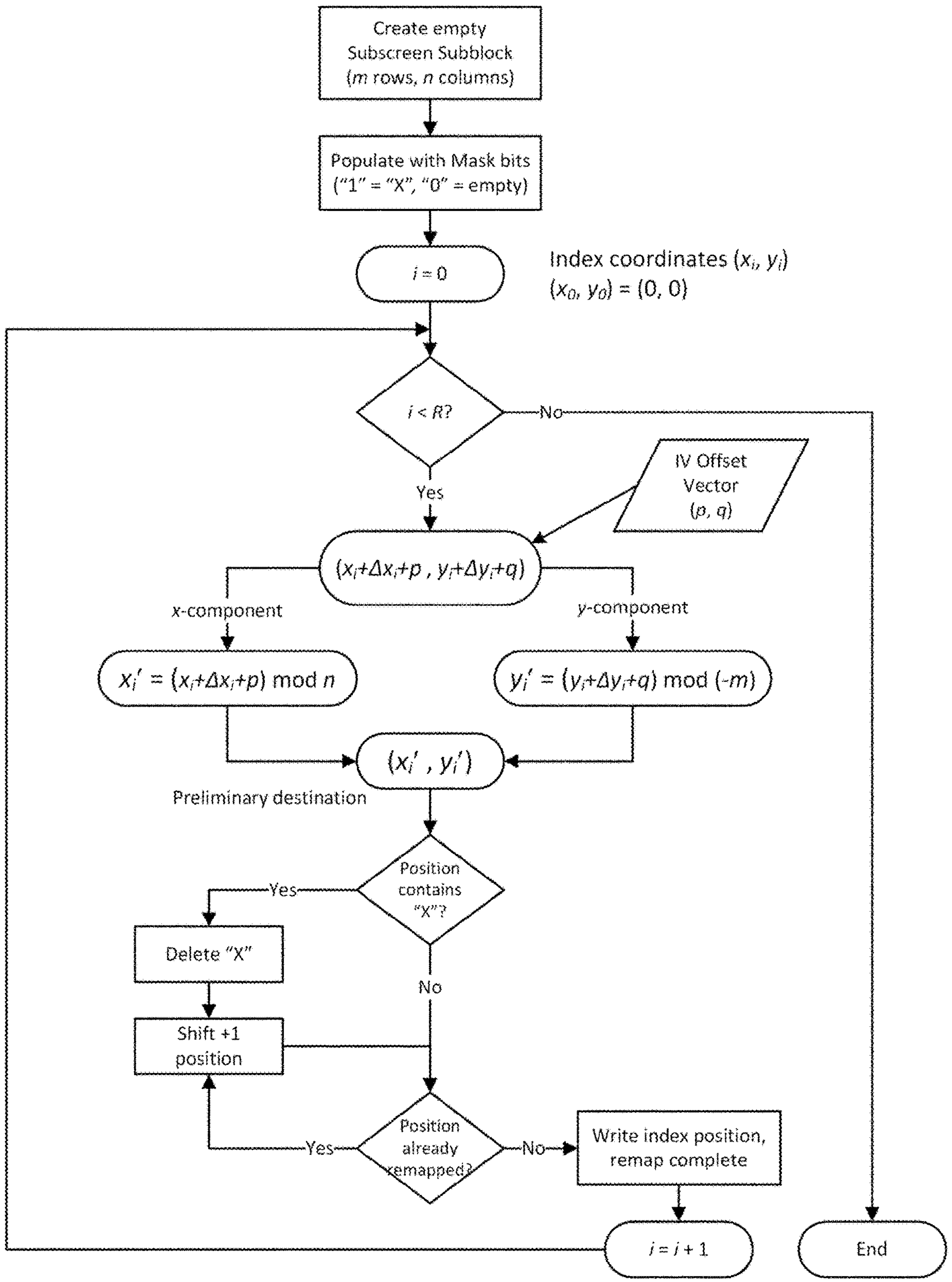
FIG. 8 depicts a process for generating remapping relationships for each of a plurality of subscreens.

Third, the source set of index positions, the movements instructions, the offset vector, and the subscreen masks are used to generate the remapping relationships for each subscreen in accordance with the flow chart shown in FIG. 8. As shown in the flow chart, the process of generating the remapping relationships for each subscreen begins by creating an empty subblock of subblock size R, with m rows and n columns, and pre-populating the index positions of the subblock with the corresponding mask bits of the applicable subscreen mask. A mask bit of "1" causes an "X" to be placed in the index position and a mask bit of "0" causes the index position to remain empty. Working in sequential order through each of the index positions of the subscreen (starting with index position 0), the process determines the coordinates of the preliminary destination index position ($x_i',y_i'$) by adding the coordinates of the source index position ($x_i,y_i$), the movement instruction ($\Delta x_i,\Delta y_i$), and the IV offset vector (p,q), as shown in the following equations:

$$x_i' = (x_i + \Delta x_i + p) \bmod n$$

$$y_i' = (y_i + \Delta y_i + q) \bmod (-m)$$

All x- and y-components must fall within the subblock, and values falling outside the subblock are adjusted using modular arithmetic.

The process then checks the contents of the preliminary destination index position ($x_i',y_i'$) and proceeds in accordance with the following rules:

1. If the preliminary destination index position is empty (i.e., does not contain an "X" or a remapped input index position), then the source index position is written into that index position. The remapping relationship between the source index position and the final destination index position is complete, and the process starts over with the next source index position.
2. If the preliminary destination index position contains an "X," the "X" is deleted from that index position. The source index position is then shifted to the next larger index position, one position at a time, until it arrives at a destination index position that does not already contain a remapped source index position (i.e., a destination position that is either empty or contains an "X"). The source index position is then written into that index position. The remapping relationship between the source index position and the final destination index position is complete, and the process starts over with the next source index position.
3. If the preliminary destination index position contains a remapped source index position, the source index position is shifted to the next larger index position, one position at a time, until it arrives at a destination index position that does not already contain a remapped source index position (i.e., a destination position that is either empty or contains an "X"). The source index position is then written into that index position. The remapping relationship between the source index position and the final destination index position is complete, and the process starts over with the next source index position.

In the above rules, any shifting of a source index position to the next larger index position requires movement to the right and wrapping to the next row down in carriage-return fashion within the subblock. It can be appreciated that the above process is repeated until every index position in the subscreen contains a remapped index position.

Figure 9A:
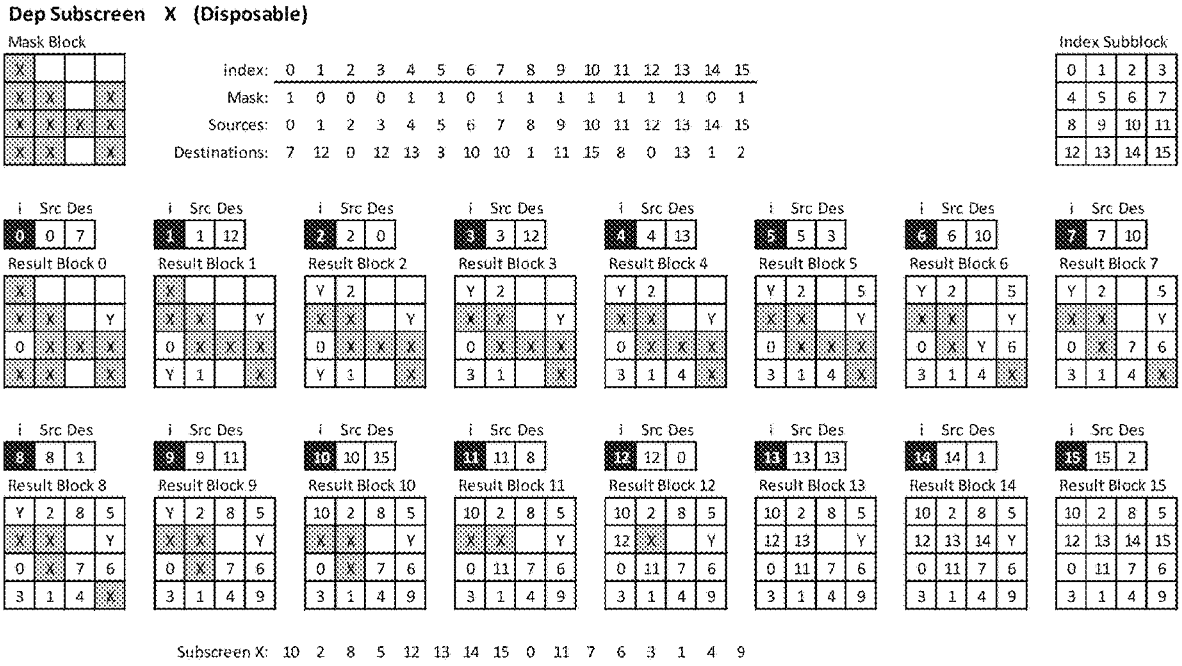
FIGS. 9A-9C depict the generation of three dependent subscreens using the process of FIG. 8.
Figure 9B:
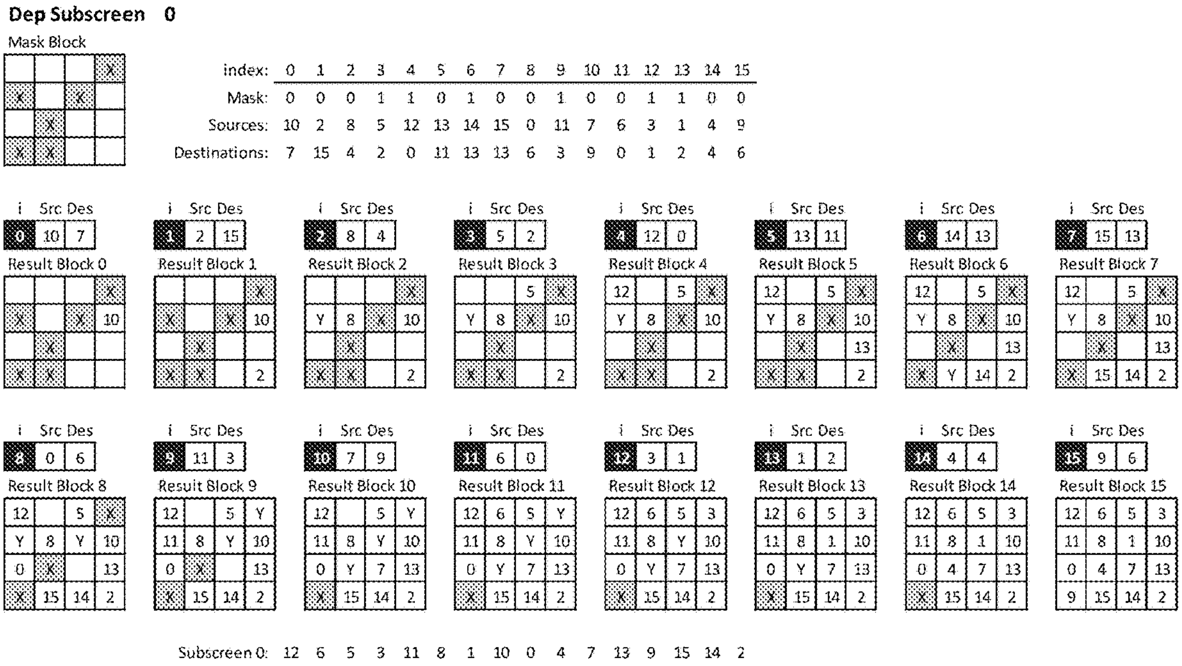
Figure 9C:
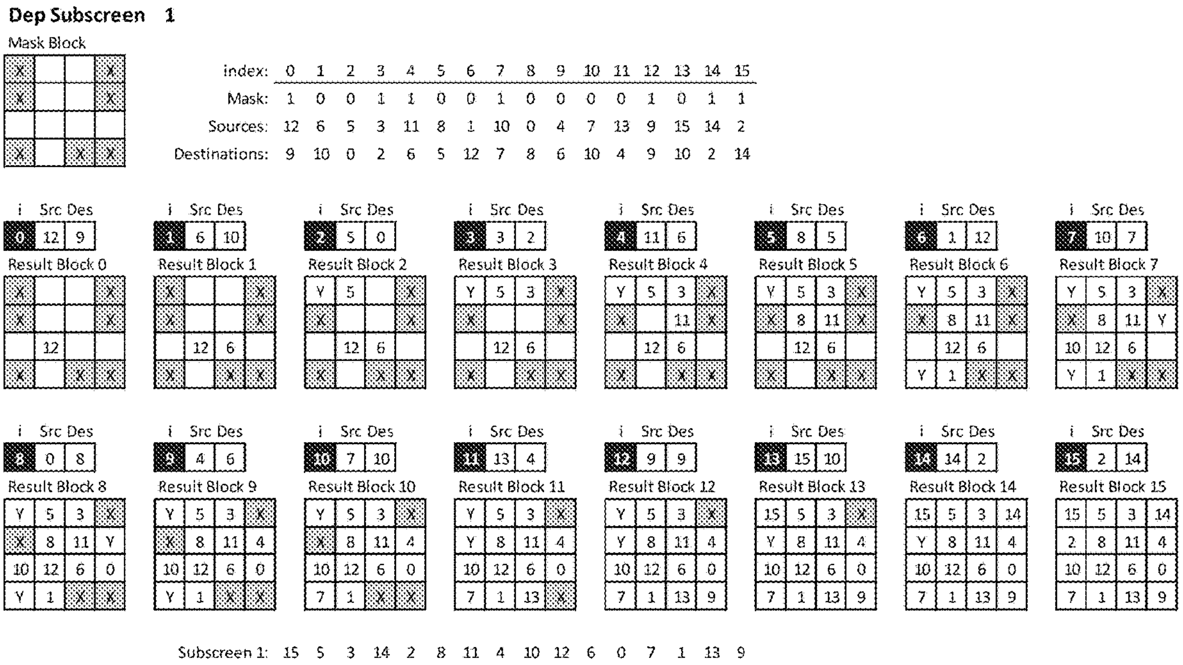
Figure 9D:
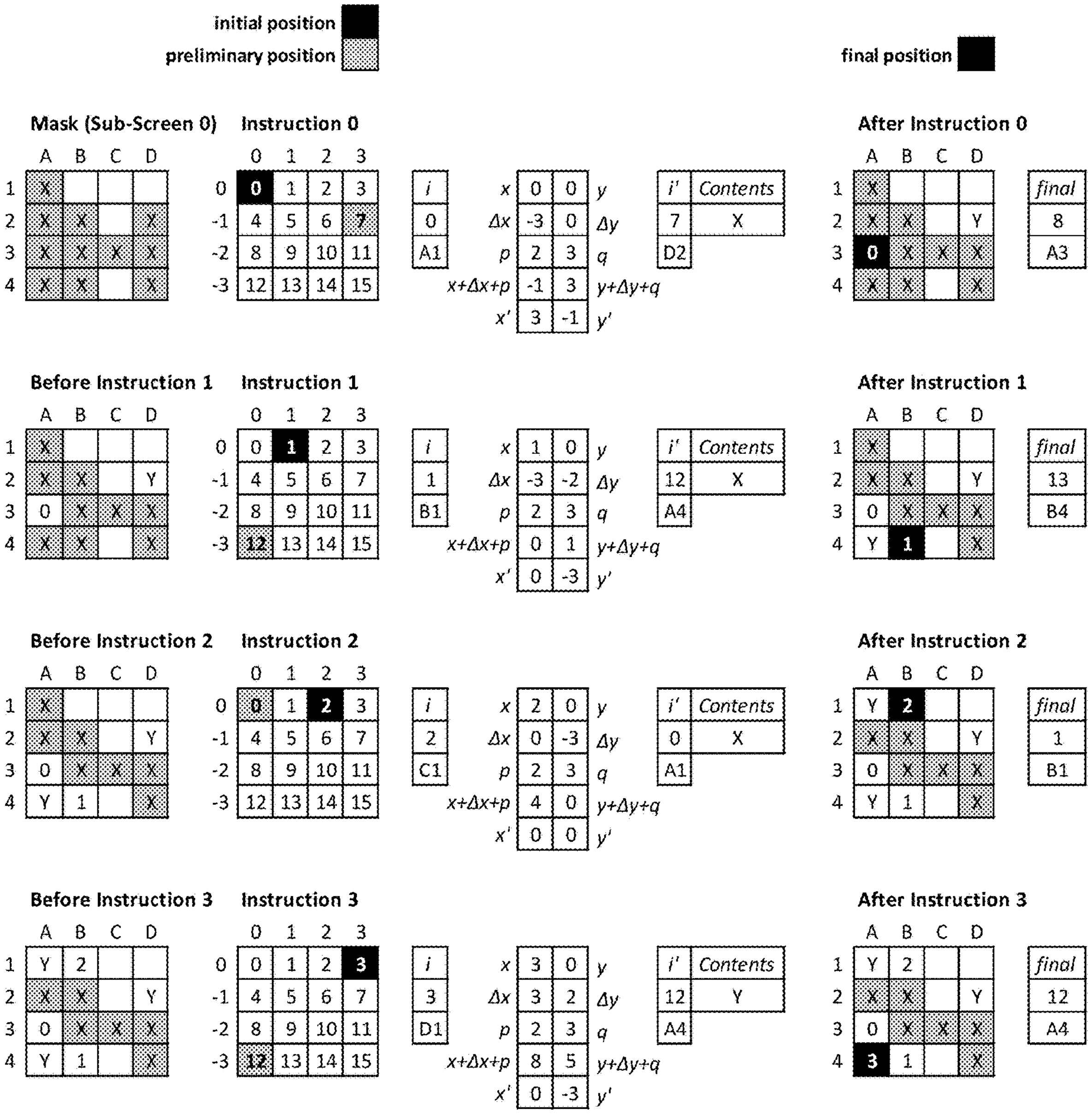
FIGS. 9D-9G depict the generation of an independent subscreen using the process of FIG. 8.
Figure 9E:
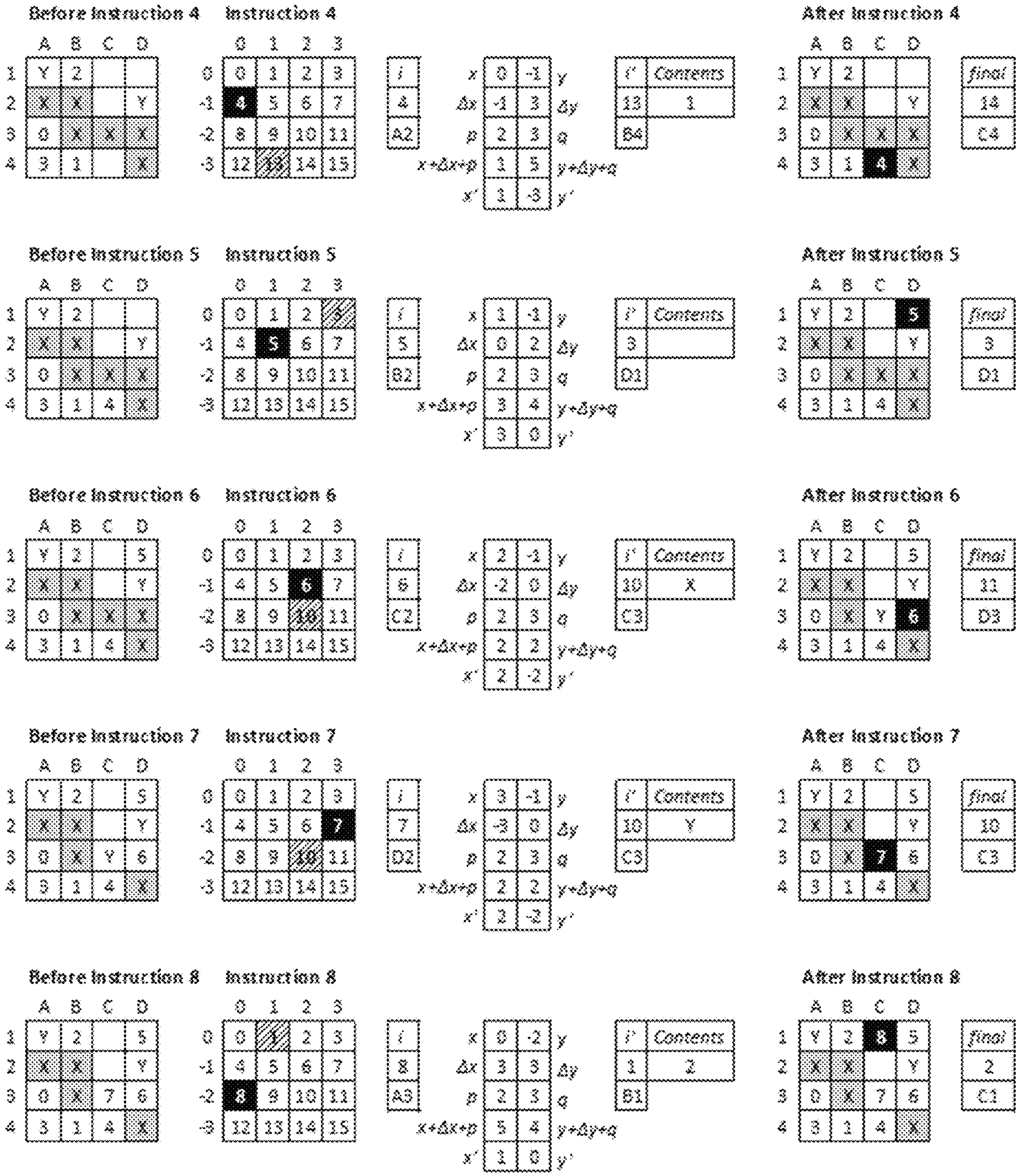
Figure 9F:
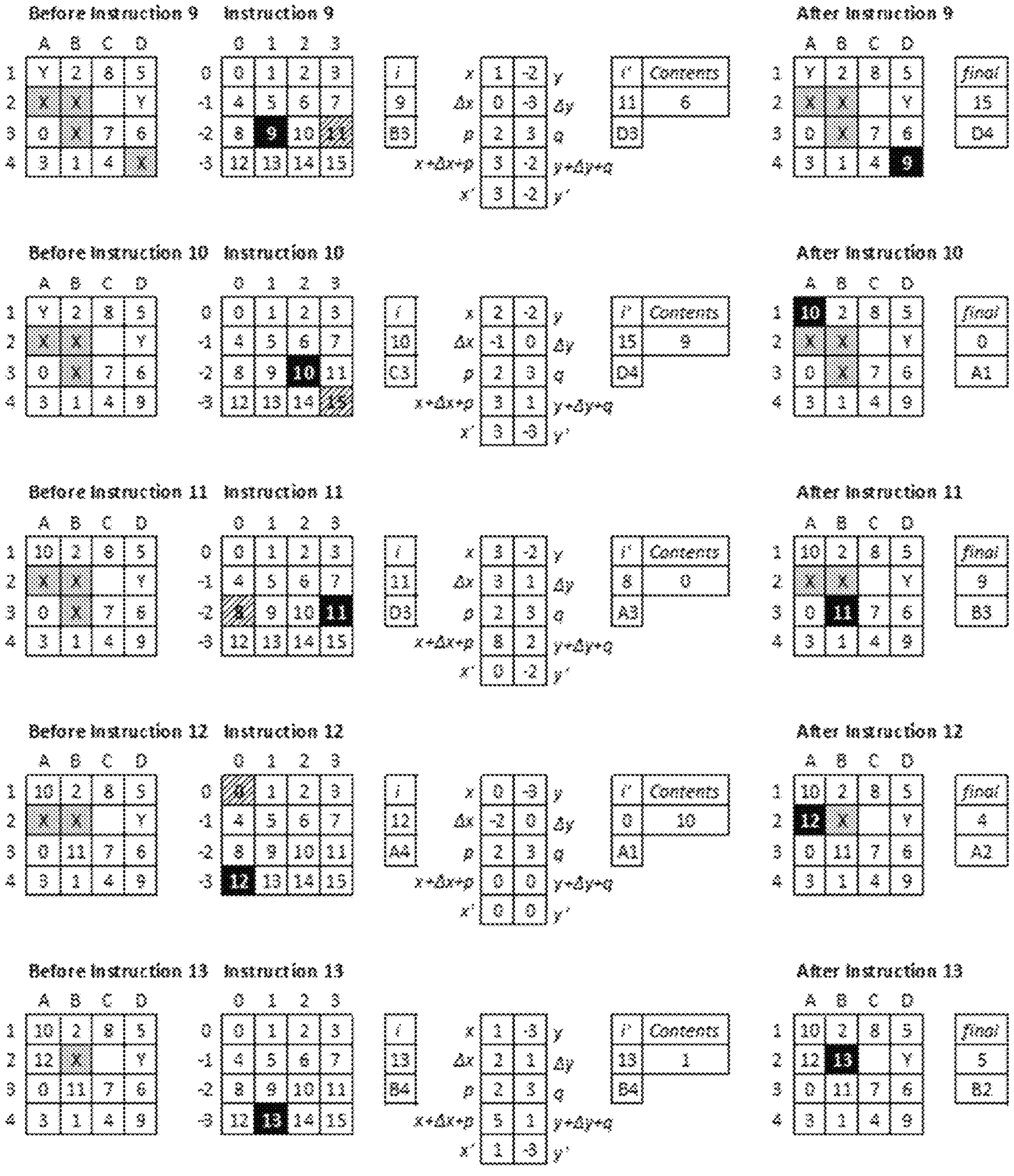
Figure 9G:
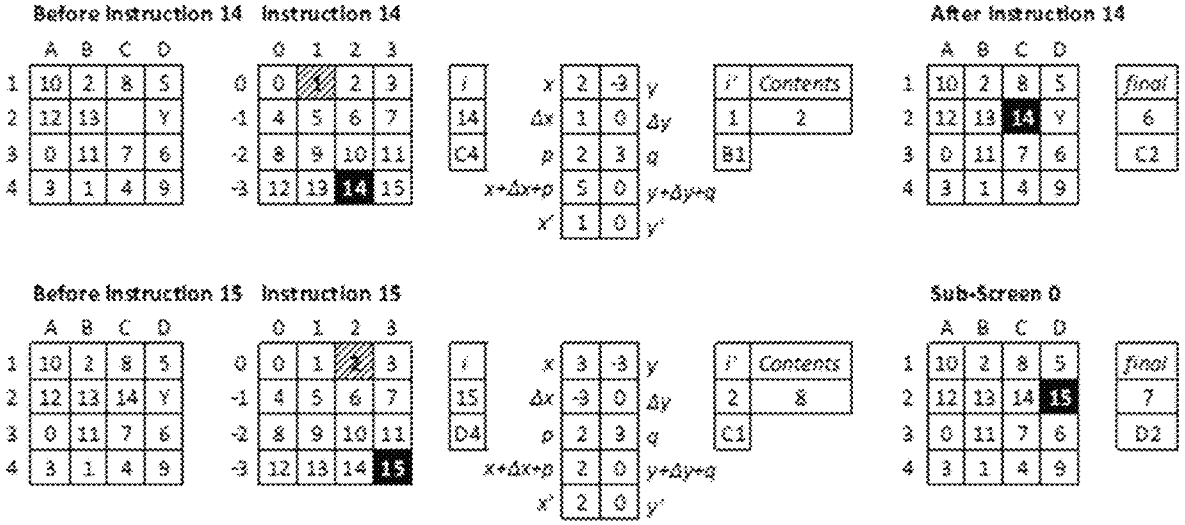

An example of the process for generating dependent subscreens will now be described in connection with FIGS. 9A-9C. FIG. 9A shows an example of the process for generating subscreen X, wherein the source index positions comprise the index positions of the index subblock—i.e., the source for subscreen X is the index subblock. FIG. 9B shows an example of the process for generating subscreen 0, wherein the source index positions comprise the final destination index positions of subscreen X—i.e., the source for subscreen 0 is subscreen X. Similarly, FIG. 9C shows an example of the process for generating subscreen 1, wherein the source index positions comprise the final destination index positions of subscreen 0—i.e., the source for subscreen 1 is subscreen 0. This process continues for the generation of subscreens 2-15 so as to provide 16 useable subscreens.

One skilled in the art will appreciate that the generation of subscreen X requires an additional R number of movement instructions and an additional R number of mask bits. This must be taken into account when determining the size of the public IV (and resultant private IV) and the sizes of the setup objects. If it is not possible to increase the public IV and/or setup object sizes (for example, because the input to the hash function would be too large), the movement instructions may be cycled through by starting over at the beginning of the table. For example, the generation of the last useable subscreen (subscreen 15) could use the same movement instructions as those used to generate subscreen X. Other embodiments will be apparent to one skilled in the art.

b. Independent Subscreens

In some embodiments, all of the subscreens are generated independently based on the same source—for example, the source may comprise the index positions of an index subblock.

In one embodiment, the total number of subscreens to be generated may be expressed as follows:

$$\text{Total Subscreens} = Q$$

where:

$$Q = 2 * \frac{B}{R}$$

Thus, in this embodiment, all of the subscreens are useable subscreens that are available for use in the creation of the screens for the various data blocks—i.e., there is no disposable subscreen in this case. As an example, for a block size B of 128 bits and a subblock size R of 16 bits, there would be a total number of 16 subscreens generated during session setup. Of course, the number (Q) of useable subscreens may be greater than or less than 2*B/R in other embodiments.

The subscreen generation process includes the following steps: (1) generate a set of movement instructions; (2) generate a mask; and (3) generate each of the independent subscreens based on a source set of index positions, the movement instructions, the p-component and q-component of the offset vector, and the mask. This process is the same as that described above for the generation of dependent subscreens, with the exception that the index subblock serves as the source set of index positions for the generation of each of the independent subscreens—i.e., each of the subscreens is independently generated based on the same source. An example of the process for generating an independent subscreen (subscreen 0) is shown in FIGS. 9D-9G. This same process is used to generate subscreens 1-15 so as to provide 16 useable subscreens.

2. Screen Assembly Process

Once the subscreens have been generated, the screen assembly process is used to generate an ordered set of subscreens numbers for each of the data blocks to be processed during a session and assemble those subscreens based on their order in the set to create a full screen for each of the data blocks. In some embodiments, the ordered set of subscreen numbers for each of the data blocks is generated from the output of one of the LFSRs used to generate the XOR blocks—for example, the LFSR for XOR block A (although other LFSRs may be used, including the LFSR for XOR block B, the LFSR for XOR block C, or the LFSR for XOR block D). The LFSR rate (ρ) used to generate the ordered set of subscreen numbers may be the same as or different than the LFSR rate (ρ) used to generate the logic blocks.

In one embodiment, the process of generating the ordered set of subscreen numbers for each of the data blocks includes the following steps:

1. Determine the number of bits that are required for each subscreen number, as follows:

$$b_{each} = len(dec2bin(Q-1))$$

2. Determine the total length of the bitstream needed for the screen, as follows:

$$b_{total} = B/R * b_{each}$$

3. Set the LFSR rate (ρ). In one embodiment, the LFSR rate (ρ) may be set to be equal to the bitstream length, as follows:

$$\rho = b_{total}$$

In another embodiment, the LFSR rate (ρ) may be set to be equal to the LFSR rate (ρ) used to generate the logic blocks.

4. Obtain the output of the appropriate LFSR step for that data block, trim the output to the required length, group the trimmed output by the number of bits required for each subscreen number, and convert each group of bits to a decimal number.

Applying steps 1-3 set forth above, the configuration settings set forth in Table 3 above may be supplemented as shown in Table 7 below (although other values may be used in other embodiments):

TABLE 7

| # Subscreens in Screen (B/R) | # Useable Subscreens (Q) | $b_{each}$ | $b_{total}$ | Rate (ρ) |
|---|---|---|---|---|
| 8 | 16 | 4 bits | 32 bits | 32 |

Figure 10:
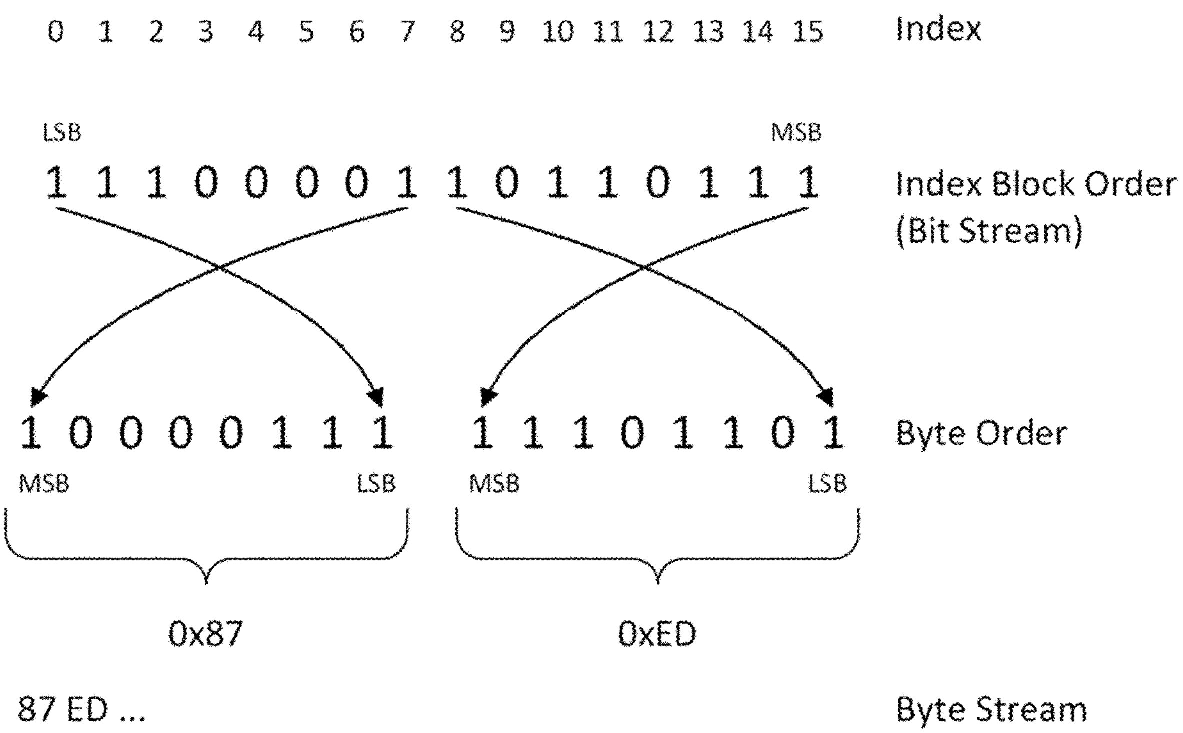
FIG. 10 depicts a bitstream and bytestream notation.

An example of the application of step 4 of the above process will now be described with reference to FIGS. 11-16. This example will include references to both a bitstream and a bytestream to visualize the same data—i.e., while the basic unit for processing is a bit, in some cases it is easier to visualize a sequence of bits as a series of bytes. The relationship between a bitstream and a bytestream is shown in FIG. 10. A bitstream is shown in index block order, with the Least-Significant Bit (i=0) on the left end of the stream and the Most-Significant Bit on the right end of the stream. To create a bytestream, the bits of the bitstream are grouped so that each group contains eight bits, the bits are reversed within each eight-bit group, and each eight-bit group is converted to hexadecimal. This convention will be used in the description of the example below.

An example LFSR (referred to as "LFSR A") is shown in FIG. 11, which includes the seed and tap bits of LFSR A. FIG. 12 shows the output of LFSR A for each of a plurality of steps, wherein some rows/steps have been omitted for purposes of brevity. For the first data block, the output of LFSR A at step 32 is obtained (as shown in FIG. 12) and trimmed to 32 bits, as follows:

Bitstream (32 bits): 00001011000111011101000110100001

Then, the trimmed bitstream is divided into groups of 4 bits and each binary group is converted to a decimal number, as follows:

| BIN | 0000 | 1011 | 0001 | 1101 | 1101 | 0001 | 1010 | 0001 |
|---|---|---|---|---|---|---|---|---|
| DEC | 0 | 11 | 1 | 13 | 13 | 1 | 10 | 1 |

Thus, the ordered set of subscreen numbers for the first data block is 0, 11, 1, 13, 13, 1, 10, 1. This process is repeated for each successive data block—for example, the subscreen numbers that are generated for data blocks 0 through 9 are shown in FIG. 13.

Once each ordered set of subscreen numbers has been generated, they are combined to create a full screen of block size B for the applicable data block. The screen index positions, $i_B$, relate to the subscreen index positions, $i_R$, using the following relationship—where the subscreens are numbered from 1 to B/R in the order of the subscreen numbers within the ordered set:

$$i_B = i_R + (\text{SubScreen Number}) \times R$$

In order to illustrate this process, it is assumed that the subscreens generated in accordance with the subscreen generation process described above are those shown in FIG. 14. Using those subscreens and the ordered sets of subscreen numbers shown in FIG. 13, the screens for data blocks 0 through 9 may be created as shown in FIG. 15.

It should be understood that the inverse screen for each data block is generated from the screen by reversing its remapping relationships.

F. Encryption and Decryption of Data Blocks

For each data segment identified for encryption, the bits of the data segment are projected into the index positions of the index block to generate a data block. As discussed above, a single bit or multiple bits may be placed in each index position. A cipher is then used to encrypt the data blocks in accordance with an encryption scheme that applies the dynamic screen and logic blocks as described above—wherein the number and order of application of the dynamic screen and logic blocks will vary depending on the implementation.

Figure 16A:
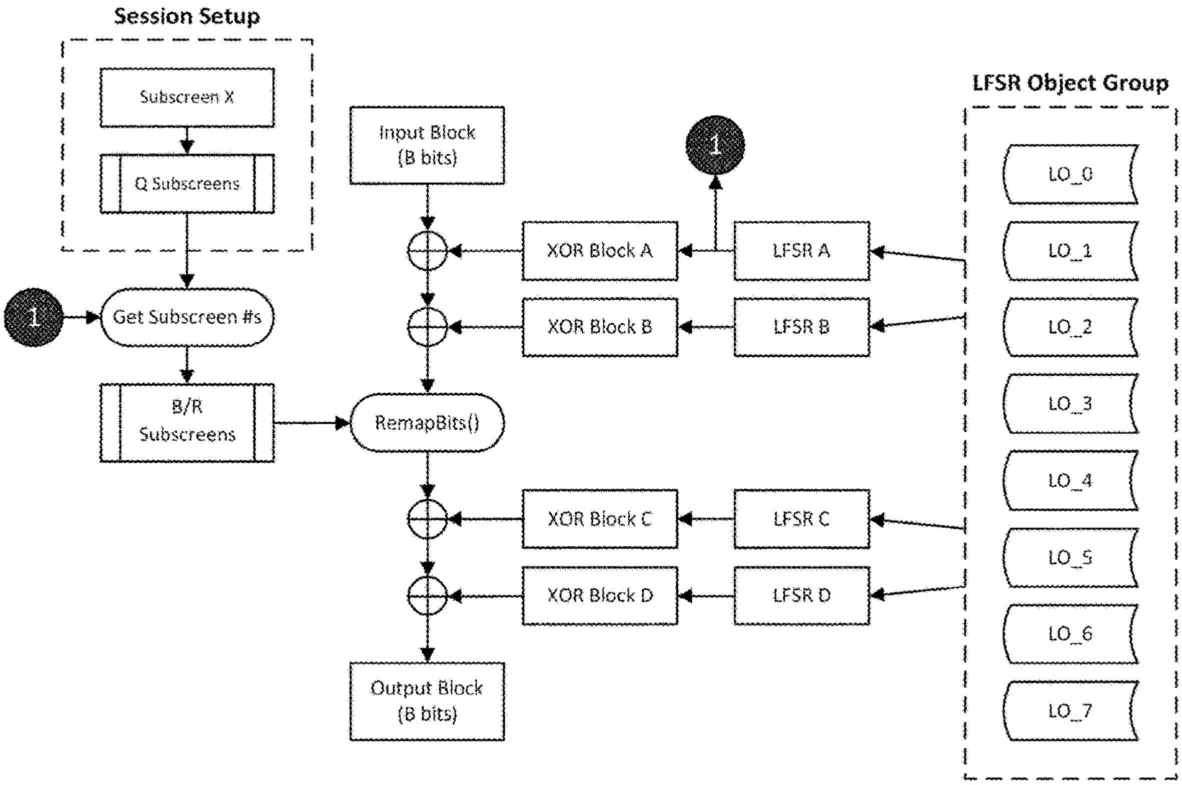
FIG. 16A depicts an encryption scheme of a cipher that uses dynamic screens and LFSR-generated logic blocks.

FIG. 16A depicts an exemplary encryption scheme of a cipher that utilizes the following operations: (1) an LFSR operation that uses an LFSR to generate an XOR block for each successive input data block—i.e., LFSR A, LFSR B, LFSR C, and LFSR D; (2) an AddXOR( ) operation (shown by the XOR symbol ⊕) that adds an XOR block to the input data block or an intermediate state data block using a bitwise XOR logical operation; and (3) a RemapBits( ) operation that applies the dynamic screen generated for each successive input data block to an intermediate state data block using a bit remapping operation that may be performed bitwise or bytewise. It can be seen that the dynamic screen is generated for each successive data block using the subscreen generation process and the screen assembly process described above, wherein LFSR A is used to generated the ordered set of subscreen numbers for each data block.

The encryption scheme occurs in one transformation round that includes the following steps: (1) the AddXOR( ) operation adds the front XOR blocks (XOR block A and XOR block B) to the input data block to generate a first intermediate state data block; (2) the RemapBits( ) operation applies the dynamic screen to the first intermediate state data block to generate a second intermediate state data block; and (3) the AddXOR( ) operation adds the back XOR blocks (XOR block C and XOR block D) to the second intermediate state block to generate the output data block. The front XOR blocks (XOR block A and XOR block B) may be added to the input data block in any order due to the commutative property of the XOR logical operation. Similarly, the back XOR blocks (XOR block C and XOR block D) may be added to the second intermediate state data block in any order due to the commutative property of the XOR logical operation.

In other embodiments, instead of applying the front XOR blocks (XOR block A and XOR block B) successively in series, XOR block A and XOR block B may be added to create a single equivalent XOR block AB, which is then added to the input data block to generate a first intermediate state data block. Similarly, instead of applying the back XOR blocks (XOR block C and XOR block D) successively in series, XOR block C and XOR block D may be added to create a single equivalent XOR block CD, which is then added to the second intermediate state block to generate the output data block.

Figure 16B:
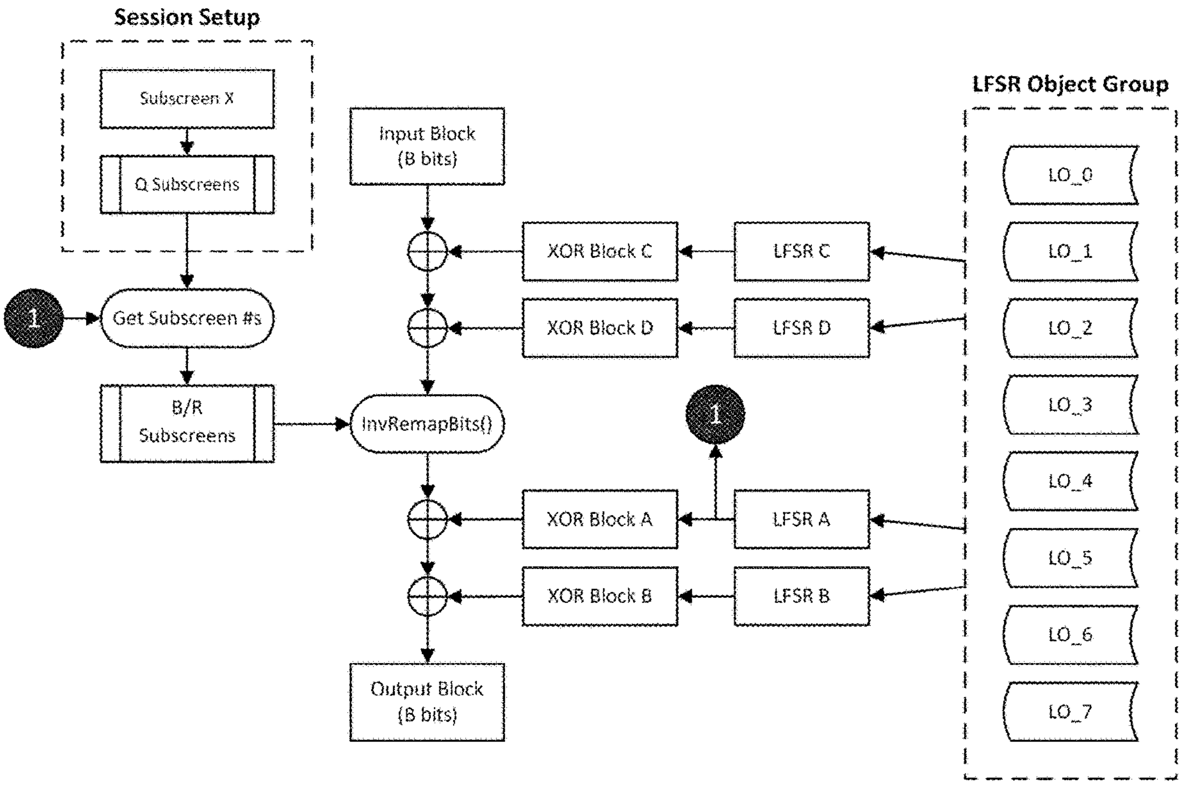
FIG. 16B depicts a decryption scheme of an inverse cipher that uses dynamic inverse screens and LFSR-generated logic blocks.

FIG. 16B depicts an exemplary decryption scheme of an inverse cipher that utilizes the following operations: (1) an LFSR operation that uses an LFSR to generate an XOR block for each successive input data block—i.e., LFSR C, LFSR D, LFSR A, and LFSR B; (2) an AddXOR( ) operation (shown by the XOR symbol ⊕) that adds an XOR block to the input data block or an intermediate state data block using a bitwise XOR logical operation; and (3) an InvRemapBits( ) operation that applies the dynamic inverse screen generated for each successive input data block to an intermediate state data block using a bit remapping operation that may be performed bitwise or bytewise. It can be seen that the dynamic inverse screen is generated for each successive data block using the subscreen generation process and the screen assembly process described above, wherein LFSR A is used to generated the ordered set of subscreen numbers for each data block.

In this example, the decryption scheme uses a dynamic inverse screen and the four XOR blocks used in the encryption scheme—i.e., two XOR blocks (XOR block C and XOR block D) are positioned before the InvRemapBits( ) operation at the front of the inverse cipher and two XOR blocks (XOR block A and XOR block B) are positioned after the InvRemapBits( ) operation at the back of the inverse cipher. Notably, the positions of the front and back XOR blocks are reversed compared to the positions of those same XOR blocks in the encryption scheme.

The decryption scheme occurs in one transformation round that includes the following steps: (1) the AddXOR( ) operation adds the front XOR blocks (XOR block C and XOR block D) to the input data block to generate a first intermediate state data block; (2) the InvRemapBits( ) operation applies the dynamic inverse screen to the first intermediate state data block to generate a second intermediate state data block; and (3) the AddXOR( ) operation adds the back XOR blocks (XOR block A and XOR block B) to the second intermediate state block to generate the output data block. The front XOR blocks (XOR block C and XOR block D) may be added to the input data block in any order due to the commutative property of the XOR logical operation. Similarly, the back XOR blocks (XOR block A and XOR block B) may be added to the second intermediate state data block in any order due to the commutative property of the XOR logical operation.

In other embodiments, instead of applying the front XOR blocks (XOR block C and XOR block D) successively in series, XOR block C and XOR block D may be added to create a single equivalent XOR block CD, which is then added to the input data block to generate a first intermediate state data block. Similarly, instead of applying the back XOR blocks (XOR block A and XOR block B) successively in series, XOR block A and XOR block B may be added to create a single equivalent XOR block AB, which is then added to the second intermediate state block to generate the output data block.

It should be understood that the present invention is not limited to the exemplary embodiments described above and that a variety of other embodiments are possible within the scope of the present invention.

III. Computing Devices and Systems

A detailed description of exemplary computing devices and methods that may be used to encrypt and decrypt data blocks for secure storage or transport of data in accordance with the present invention will now be described.

Figure 17:
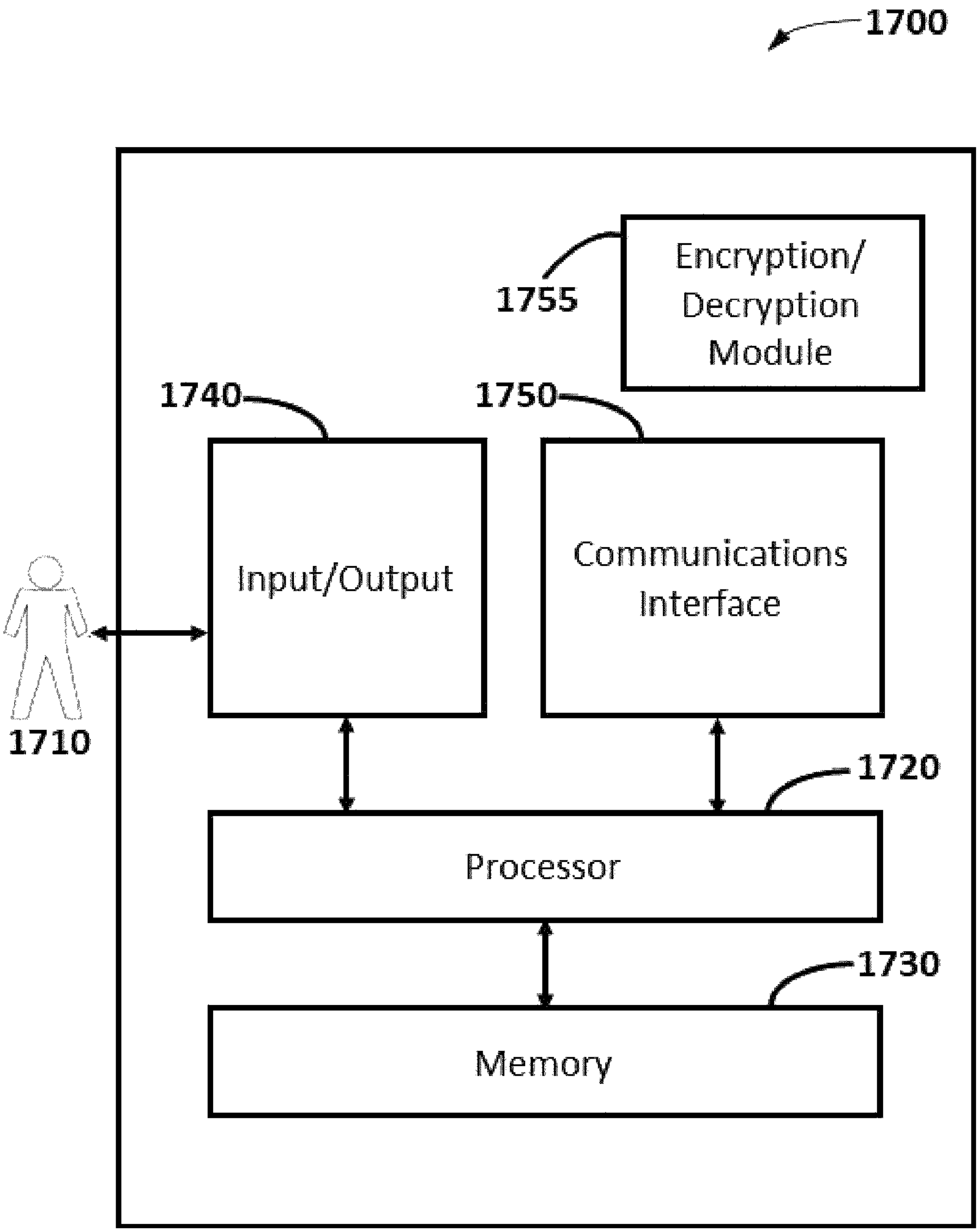
FIG. 17 is a block diagram of an exemplary computing device that enables the encryption and decryption of data.

FIG. 17 illustrates an exemplary computing device 1700 that enables the encryption of data for storage or transport in accordance with the different embodiments of the present invention. Computing device 1700 may comprise any type of computing device capable of performing the functions described herein, including, but not limited to, desktop computing devices, laptop computing devices, computing peripheral devices, smart phones, wearable computing devices, medical computing devices, tablet computing devices, mobile computing devices, vehicular computing devices, and the like. While exemplary components of computing device 1700 will be described below, it should be understood that other components with characteristics that are more or less advanced or functional than those of the described components may alternatively be used in accordance with the present invention.

In the exemplary configuration shown in FIG. 17, computing device 1700 is operated by a user 1710 and generally includes the following components: a processor 1720, a memory area 1730, an input/output unit 1740, a communications interface 1750, and an encryption/decryption module 1755. Of course, other components may also be provided depending on the configuration of the computing device. Each of the components shown in FIG. 17 will be described below.

Processor 1720 is configured to execute instructions stored in memory area 1730 and functions to control input/output unit 1740 and communications interface 1750. The processor may comprise central processing units, microprocessors, microcontrollers, reduced instruction set circuits (RISC), application specific integrated circuits (ASIC), logic circuits (e.g., field-programmable gate array), and any other circuit or processor capable of executing the functions described herein. Processor 1720 may also include one or more processing units, for example, a multi-core configuration. Memory area 1730 may comprise any type of memory that allows data and executable instructions to be stored and retrieved, such as a flash memory drive, digital versatile disc (DVD), compact disc (CD), fixed (hard) drive, diskette, optical disk, magnetic tape, or semiconductor memory such as read-only memory (ROM). The encrypted data blocks generated in accordance with the present invention may be stored in memory area 1730 in any format, including structured formats (e.g., structured files or databases) or unstructured formats.

Preferably, data passing from processor 1720 to memory area 1730 is encrypted via the application of a dynamic screen and one or more logic blocks and, conversely, encrypted data passing from memory area 1730 to processor 1720 is decrypted via the application of a dynamic inverse screen and one or more logic blocks. The data may be encrypted and decrypted at the file system layer so that the screens and/or logic blocks are applied to all reads and writes to the file system. Alternatively, the encryption and decryption may operate below the file system layer using, for example, a volume manager.

Input/output unit 1740 is configured to receive information from and provide information to user 1710. In some examples, input/output unit 1740 may include an output adapter such as a video adapter and/or an audio adapter. Input/output unit 1740 may alternatively include an output device such as a display device, a liquid crystal display (LCD), an organic light emitting diode (OLED) display, an "electronic ink" display, and/or an audio output device such as a speaker or headphones. Input/output unit 1740 may also include any device, module, or structure for receiving input from user 1710, including, but not limited to, a keyboard, a pointing device, a mouse, a stylus, a touch sensitive panel, a touch pad, a touch screen, a gyroscope, an accelerometer, a position detector, or an audio input device. A single component such as a touch screen may function as both an output device and an input device. Input/output unit 1740 may further include multiple sub-components for carrying out the input and output functions. In other examples, input/output unit 1740 may be of limited functionality or non-functional as in the case of some wearable computing devices.

Communication interface 1750 is configured to enable communication with a remote device, such as a remote server, a remote computing device, or any other suitable system. Communication interface 1750 may include, for example, a wired or wireless network adapter or a wireless data transceiver for use with a mobile data network or Worldwide Interoperability for Microwave Access (WiMAX).

Encryption/decryption module 1755 is configured to enable the encryption, decryption, and data security functions described herein. Specifically, encryption/decryption module 1755 includes instructions that are executed by processor 1720 to generate the dynamic screens and logic blocks and then apply those dynamic screens and logic blocks to encrypt and decrypt a plurality of data blocks, as described generally above.

Figure 18:
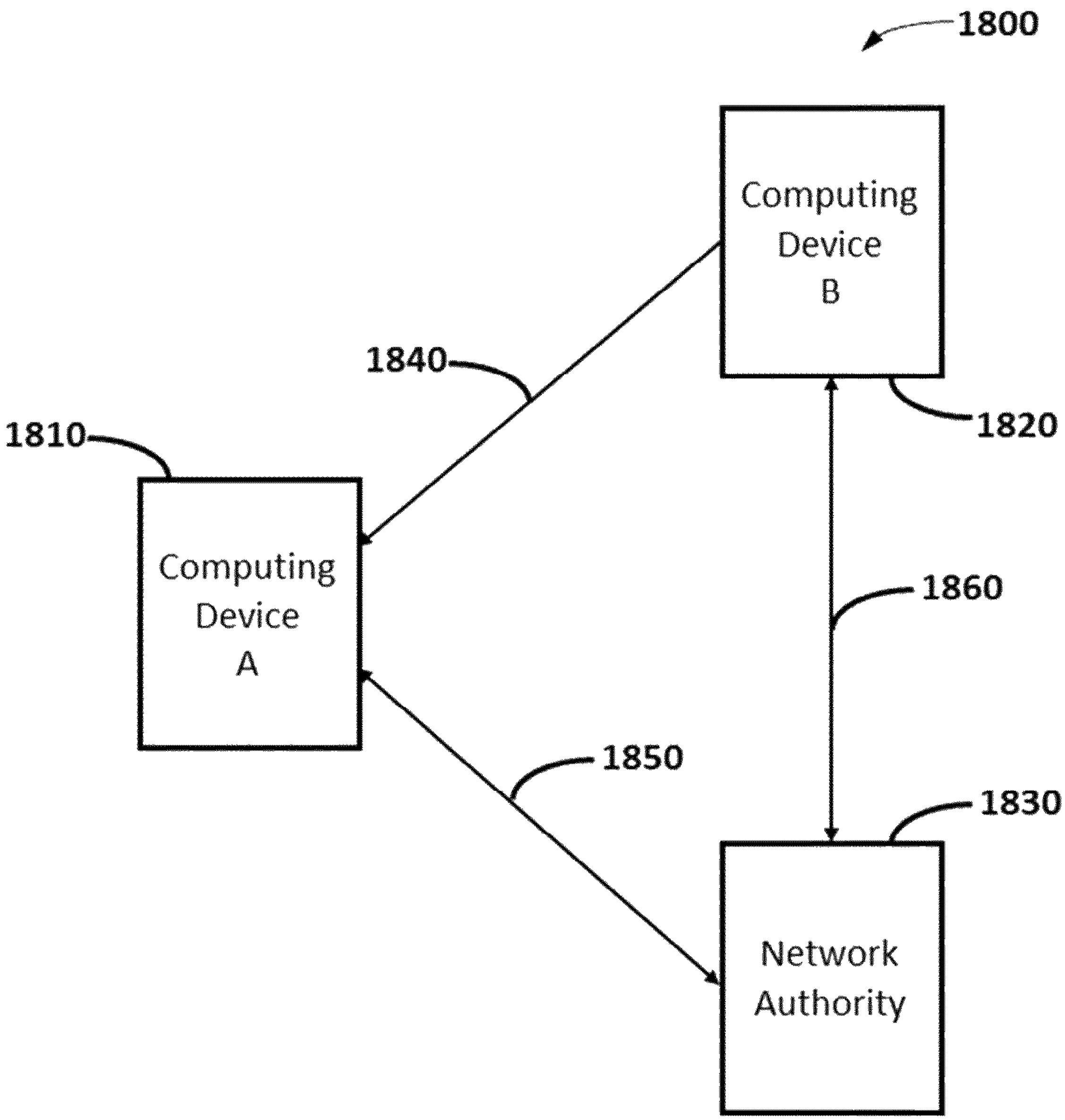
FIG. 18 is a block diagram of an exemplary system that enables the transport of encrypted data between first and second computing devices.

FIG. 18 is a block diagram of an exemplary system 1800 that enables the transport of encrypted data between a first computing device 1810 and a second computing device 1820 in accordance with the present invention. The configurations of first computing device 1810 and second computing device 1820 are the same as that of computing device 1700 shown in FIG. 17. In system 1800, a network authority 1830 is also provided to manage transport level encryption for data transmitted between first computing device 1810 and second computing device 1820.

As can be seen, first computing device 1810 is in communication with second computing device 1820 via a communication link 1840. Also, first computing device 1810 is in communication with network authority 1830 via a communication link 1850 and, similarly, second computing device 1820 is in communication with network authority 1830 via a communication link 1860. Communication links 1840, 1850 and 1860 represent any suitable wired or wireless communication links known in the art, including, but not limited to, those provided by the Internet or any other computer network.

Figure 19:
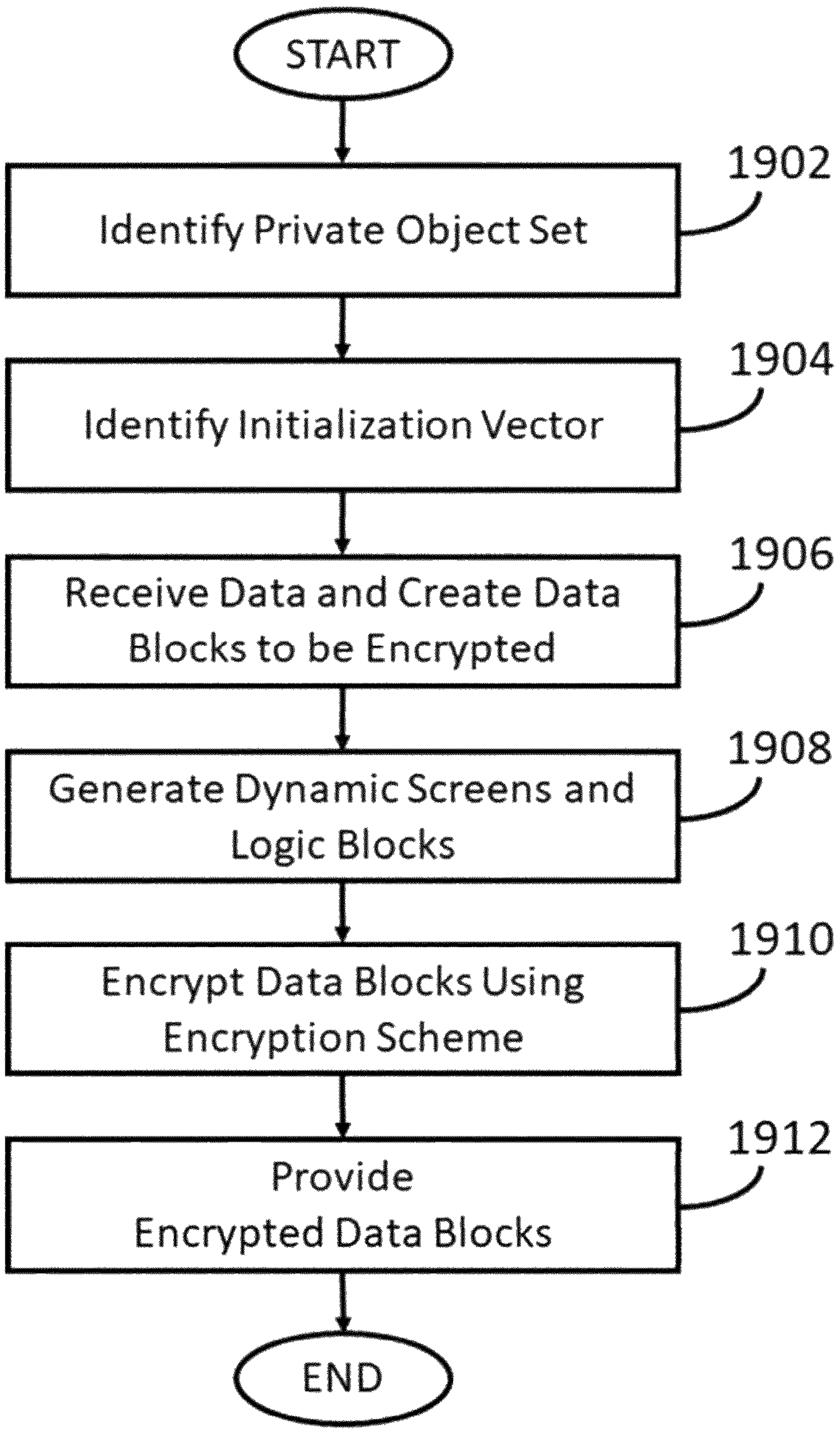
FIG. 19 is a flowchart of an exemplary data encryption method performed by the computing device of FIG. 17 or one of the computing devices of FIG. 18.

FIG. 19 is a flowchart of an exemplary data encryption method performed by computing device 1700 of FIG. 17 (or one of the computing devices of FIG. 18). In step 1902, computing device 1700 identifies the private object group to be used in the encryption scheme. As described above, the private object group may comprise a setup object set and an LFSR object set. In step 1904, computing device 1700 identifies an initialization vector to be used in the encryption scheme.

In step 1906, computing device 1700 receives data, identifies a plurality of data segments to be encrypted, and positions the bits of the data segments within index blocks to generate a plurality of data blocks. In step 1908, computing device 1700 generates the dynamic screens and logic blocks to be used in the encryption scheme. In step 1910, computing device 1700 encrypts each of the data blocks by applying the dynamic screens and logic blocks in accordance with the encryption scheme. Finally, in step 1912, computing device 1700 provides the encrypted data blocks for storage in memory area 1730. Alternatively, computing device 1700 may transport the encrypted data blocks to another computing device or to a remote server for storage.

Figure 20:
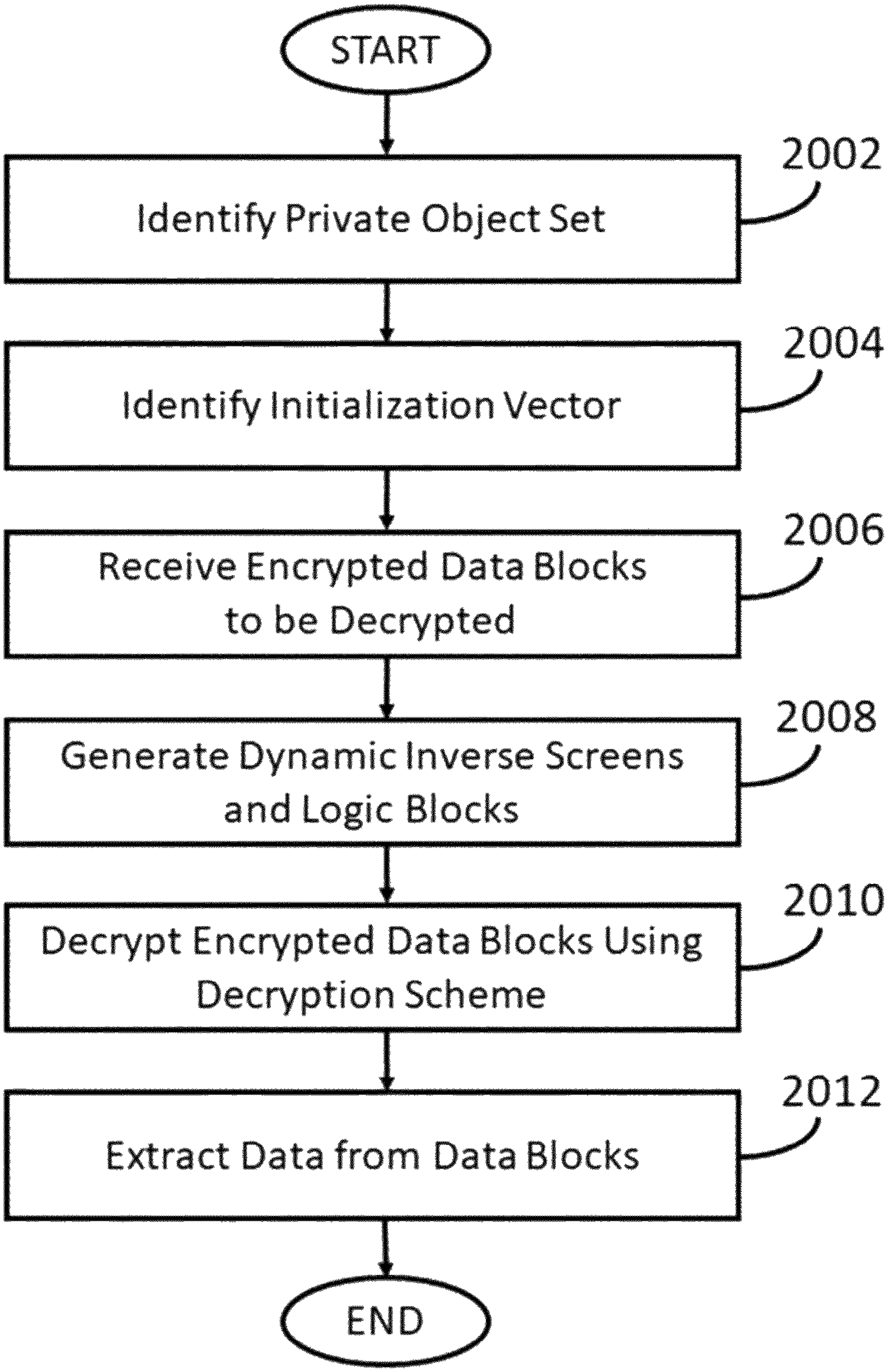
FIG. 20 is a flowchart of an exemplary data decryption method performed by the computing device of FIG. 17 or one of the computing devices of FIG. 18.

FIG. 20 is a flowchart of an exemplary data decryption method performed by computing device 1700 of FIG. 17 (or one of the computing devices of FIG. 18). In step 2002, computing device 1700 identifies the private object group to be used in the decryption scheme. As described above, the private object group may comprise a setup object set and an LFSR object set. In step 2004, computing device 1700 identifies an initialization vector to be used in the decryption scheme.

In step 2006, computing device 1700 receives previously encrypted data blocks to be decrypted. In step 2008, computing device 1700 generates the dynamic inverse screens and logic blocks to be used in the decryption scheme. In step 2010, computing device 1700 decrypts each of the data blocks by applying the dynamic inverse screens and logic blocks in accordance with the decryption scheme. Finally, in step 2012, computing device 1700 extracts the data from the decrypted data blocks in order to allow authorized users (e.g., users with the appropriate objects) to access the data.

One skilled in the art will appreciate that the data encryption and decryption methods described above in connections with FIGS. 19 and 20 may be implemented using any computer programming or engineering techniques including computer software, firmware, hardware or any combination or subset thereof. Any computer program, having computer-readable code means, may be embodied or provided within one or more computer-readable media, thereby making a computer program product, i.e., an article of manufacture. Computer-readable storage media are tangible and non-transitory and store information such as computer-readable instructions, data structures, program modules, and other data.

Computing devices that implement the encryption and decryption methods of the present invention provide several advantages that are not available from many existing encryption/decryption methodologies. For example, the encryption and decryption methods support error correcting code so as to increase reliability. Also, the encryption and decryption methods increase the efficiency and reduce the power consumption of the computing device, and may increase throughput—i.e., the amount of data moved from one place to another in a given time period. In addition, the encryption and decryption methods are flexible and may provide increased data security. Further, the encryption and decryption methods enable the use of smaller block sizes to support lower-latency applications. Finally, the encryption and decryption methods enable a larger volume of data to be secured by selecting a larger quantity of logic blocks and/or larger LFSR objects. Of course, other advantages will be apparent to one skilled in the art.

IV. General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second, top and bottom, and left and right, are used solely to distinguish one unit or action from another unit or action without necessarily requiring or implying any actual such relationship or order between such units or actions. For example, while the index blocks referenced herein require a certain spatial relationship between index positions of the index blocks, any equivalent structures may be used. Also, as described herein, the objects do not require any particular format, size, or definition other than to allow for the creation of the screens as described herein.

The use of the terms "comprises," "comprising," or any other variation thereof, are intended to cover a non-exclusive inclusion, such that a process, method, device, or system that comprises a list of elements does not include only those elements, but may include other elements not expressly listed or inherent to such process, method, device, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A data encryption method, comprising:

creating a plurality of data blocks each of which comprises a plurality of bits positioned in an index block comprising a plurality of index positions;

generating a plurality of dynamic screens each of which identifies a correspondence between a plurality of initial index positions and a plurality of remapped index positions within the index block; and encrypting the data blocks in accordance with an encryption scheme that performs a bit remapping operation using a different one of the dynamic screens in connection with each of the data blocks, wherein the step of generating the dynamic screens comprises:

generating a plurality of useable subscreens;

selecting a different subset of the useable subscreens for each of the dynamic screens; and assembling the subset of the useable subscreens to generate each of the dynamic screens, and wherein the useable subscreens comprise a plurality of dependent subscreens each of which is dependently generated based on a previously-generated subscreen.

2. The data encryption method of claim 1, wherein the useable subscreens comprise a plurality of independent subscreens each of which is independently generated based on an index subblock.

3. The data encryption method of claim 1, wherein the useable subscreens are generated based on one or more sources in combination with a set of movement instructions, a plurality of subscreen masks, and an offset vector.

4. The data encryption method of claim 1, wherein the step of generating the dynamic screens comprises:
generating a plurality of useable subscreens each of which is associated with a subscreen number;
generating an ordered set of subscreen numbers for each of the dynamic screens; and
assembling a subset of the useable subscreens in accordance with the ordered set of subscreen numbers to generate each of the dynamic screens.

5. The data encryption method of claim 4, wherein the step of generating the ordered set of subscreen numbers for each of the dynamic screens comprises:
implementing a linear-feedback shift register (LFSR) to generate a plurality of LFSR outputs, wherein the ordered set of subscreen numbers for each of the dynamic screens is based on one of the LFSR outputs.

6. The data encryption method of claim 4, wherein the step of generating the ordered set of subscreen numbers for each of the dynamic screens comprises:
implementing a linear-feedback shift register (LFSR) to generate a plurality of LFSR outputs each of which comprises a sequence of bits;
selecting a subset of the LFSR outputs based on an LFSR rate;
truncating each of the selected LFSR outputs to a designated number of bits;
grouping the designated number of bits into a plurality of bit groups;
converting each of the bit groups to an integer; and
using the integer of each of the bit groups to provide the ordered set of subscreen numbers for each of the dynamic screens.

7. A data encryption method, comprising:
creating a plurality of data blocks each of which comprises a plurality of bits;
generating a plurality of logic blocks for each of the data blocks;
generating a different dynamic screen for each of the data blocks; and
encrypting the data blocks in accordance with an encryption scheme that transforms a data block into an encrypted data block by: (a) modifying the bits of the data block using a first portion of the logic blocks generated for the data block to thereby generate a first intermediate state data block; (b) remapping the modified bits of the first intermediate state data block using the dynamic screen generated for the data block to thereby generate a second intermediate state data block; and (c) modifying the remapped bits of the second intermediate state data block using a second portion of the logic blocks generated for the data block to thereby generate the encrypted data block,
wherein the step of generating a dynamic screen comprises:
generating a plurality of useable subscreens;
selecting a different subset of the useable subscreens for each of the dynamic screens; and
assembling the subset of the useable subscreens to generate each of the dynamic screens,
and wherein the useable subscreens comprise a plurality of dependent subscreens each of which is dependently generated based on a previously-generated subscreen.

8. The data encryption method of claim 7, wherein the useable subscreens comprise a plurality of independent subscreens each of which is independently generated based on an index subblock.

9. The data encryption method of claim 7, wherein the useable subscreens are generated based on one or more sources in combination with a set of movement instructions, a plurality of subscreen masks, and an offset vector.

10. The data encryption method of claim 7, wherein the step of generating the dynamic screen for each of the data blocks comprises:
generating a plurality of useable subscreens each of which is associated with a subscreen number;
generating an ordered set of subscreen numbers for the dynamic screen; and
assembling a subset of the useable subscreens in accordance with the ordered set of subscreen numbers to generate the dynamic screen.

11. The data encryption method of claim 10, wherein the step of generating the ordered set of subscreen numbers for the dynamic screen comprises:
implementing a linear-feedback shift register (LFSR) to generate a plurality of LFSR outputs, wherein the ordered set of subscreen numbers for the dynamic screen is based on one of the LFSR outputs.

12. The data encryption method of claim 10, wherein the step of generating the ordered set of subscreen numbers for the dynamic screen comprises:
implementing a linear-feedback shift register (LFSR) to generate a plurality of LFSR outputs each of which comprises a sequence of bits;
selecting one of the LFSR outputs based on an LFSR rate;
truncating the selected one of the LFSR outputs to a designated number of bits;
grouping the designated number of bits into a plurality of bit groups;
converting each of the bit groups to an integer; and
using the integer of each of the bit groups to provide the ordered set of subscreen numbers for the dynamic screen.

13. The data encryption method of claim 7, further comprising one or both of (a) storing the encrypted data block as a representation of the data block and (b) transporting the encrypted data block as a representation of the data block.

14. The data encryption method of claim 7, wherein the encryption scheme is implemented in a single round.

* * * * *